US011343290B2

(12) United States Patent
Palandurkar et al.

(10) Patent No.: US 11,343,290 B2
(45) Date of Patent: May 24, 2022

(54) METHODS AND SYSTEMS FOR FACILITATING CONTEXT-TO-CALL COMMUNICATIONS BETWEEN COMMUNICATION POINTS IN MULTIPLE COMMUNICATION MODES

(71) Applicant: V GROUP INC., Cranbury, NJ (US)

(72) Inventors: Vijay Kumar Palandurkar, West Windwor, NJ (US); Aakash Savita, Dayton, NJ (US)

(73) Assignee: V Group Inc., Cranbury, NJ (US)

( * ) Notice: Subject to any disclaimer, the term of this patent is extended or adjusted under 35 U.S.C. 154(b) by 0 days.

(21) Appl. No.: 17/172,074

(22) Filed: Feb. 10, 2021

(65) Prior Publication Data
US 2021/0273980 A1    Sep. 2, 2021

Related U.S. Application Data

(60) Provisional application No. 62/982,445, filed on Feb. 27, 2020.

(51) Int. Cl.
*H04L 65/1069* (2022.01)
*H04W 4/20* (2018.01)
*H04L 65/403* (2022.01)
*H04M 3/51* (2006.01)

(52) U.S. Cl.
CPC ........ *H04L 65/1069* (2013.01); *H04L 65/403* (2013.01); *H04W 4/20* (2013.01); *H04M 3/51* (2013.01); *H04M 2203/10* (2013.01); *H04M 2203/654* (2013.01)

(58) Field of Classification Search
CPC .... H04L 65/403; H04L 65/1069; H04M 3/51; H04M 2203/10; H04M 2203/654; H04W 4/20
USPC ................ 370/259–271, 351–357; 709/206; 379/265.01–266.1
See application file for complete search history.

(56) References Cited

U.S. PATENT DOCUMENTS

| 6,385,646 | B1 | 5/2002 | Brown et al. | |
|---|---|---|---|---|
| 6,553,113 | B1 * | 4/2003 | Dhir | H04M 3/493 379/265.02 |
| 6,757,365 | B1 * | 6/2004 | Bogard | H04M 3/5307 379/88.17 |

(Continued)

*Primary Examiner* — Hemant S Patel
(74) *Attorney, Agent, or Firm* — Kanika Radhakrishnan; Evergree Valley Law Group

(57) ABSTRACT

Methods and systems for facilitating communication sessions between multiple communication points. The method includes receiving a communication request from a first user device associated with a first user, through a first communication point. The first communication point may be enabled with a context-to-call (C2C) feature. The method further includes determining a first communication mode selected by the first user device through the first communication point. The method includes identifying a second communication mode selected by a second user device associated with a second user. The method further includes processing the communication request based, at least in part, on a matching between the first communication mode and the second communication mode. The method further includes transmitting the communication request from the first user device to the second user device. The method includes initiating a communication session based on the processing step.

20 Claims, 16 Drawing Sheets

(56) References Cited

U.S. PATENT DOCUMENTS

| | | | |
|---|---|---|---|
| 6,853,711 B2* | 2/2005 | Brisebois | H04M 3/42042 |
| | | | 379/142.06 |
| 7,127,495 B2 | 10/2006 | Brown et al. | |
| 7,483,525 B2* | 1/2009 | Chaddha | H04L 51/24 |
| | | | 379/142.07 |
| 7,623,643 B2* | 11/2009 | Raghav | H04M 1/72436 |
| | | | 379/201.01 |
| 8,023,622 B2 | 9/2011 | Timmins | |
| 8,510,773 B1* | 8/2013 | Abou-Rizk | H04N 21/25841 |
| | | | 725/34 |
| 8,719,434 B2 | 5/2014 | Prajapat et al. | |
| 8,861,689 B1* | 10/2014 | Typrin | H04M 19/04 |
| | | | 379/88.22 |
| 9,385,981 B2* | 7/2016 | Haugen | H04L 51/10 |
| 9,619,277 B2 | 4/2017 | Matsumoto | |
| 2002/0131573 A1* | 9/2002 | Berkley | H04L 29/06 |
| | | | 379/201.01 |
| 2004/0258216 A1* | 12/2004 | Reid | H04M 3/42229 |
| | | | 379/88.13 |
| 2007/0168537 A1* | 7/2007 | Misra | H04L 29/06027 |
| | | | 709/230 |
| 2007/0250633 A1* | 10/2007 | Norby | H04L 51/36 |
| | | | 709/227 |
| 2007/0294354 A1* | 12/2007 | Sylvain | H04M 7/003 |
| | | | 709/206 |
| 2008/0285729 A1* | 11/2008 | Glasgow | H04L 51/00 |
| | | | 379/88.13 |
| 2012/0316861 A1* | 12/2012 | Custer | G06F 40/58 |
| | | | 704/2 |
| 2013/0198039 A1* | 8/2013 | Sridharan | G06Q 30/0613 |
| | | | 705/26.44 |

\* cited by examiner

METHODS AND SYSTEMS FOR FACILITATING CONTEXT-TO-CALL COMMUNICATIONS BETWEEN COMMUNICATION POINTS IN MULTIPLE COMMUNICATION MODES

TECHNICAL FIELD

The present invention relates to the field of communications and, more particularly, for facilitating context-to-call communications between multiple communication points in multiple communication modes.

BACKGROUND

Contact centre systems provide support for users regarding a product or service by allowing the users to make requests for service that can include a question posed by the user related to the product or service. Generally, the contact centre systems receive requests for service, e.g., in the form of a phone call, web page form, instant message, email, etc., and route the requests to a human agent for addressing the request and providing an answer to the question.

Conventionally, when a user wants to directly contact a business or a customer representative or agent via number/or email address provided on the website, the user would have to copy the number from the website to a mobile phone to place the call or have to send an email with few clicks. Additionally, the user may also contact a chatbot; however, the majority of chatbots are trained to answer a set of fed intents that have less probability of providing an accurate response to the user. Few chatbot platforms provide phone numbers towards the end of an unresolved interaction forcing users to dial a number and traverse complicated menus till they reach an agent who can assist them with the problem.

This results in loss of time and effort of the users, as users are forced to restate their purpose of the call and authenticate before any help is provided, and rising uncertainties if the message has reached the right person, often leading to frustrating a user and a loss of a potential business opportunity.

Hence, there is a need for methods and systems including a single platform that enables interaction between multiple communication points through multiple communication modes.

SUMMARY

Various embodiments of the present disclosure provide methods and systems for facilitating communication between multiple communication points using multiple communication modes.

In an embodiment, a computer-implemented method is disclosed. The computer-implemented method includes receiving a communication request from a first user device associated with a first user, through a first communication point. The computer-implemented method further includes determining a first communication mode selected by the first user device through the first communication point. The computer-implemented method includes determining a second communication mode selected by a second user device associated with a second user. The computer-implemented method includes processing the communication request based, at least in part, on a matching between the first communication mode and the second communication mode. The computer-implemented method further includes initiating a communication session based, at least in part, on the processing step.

In another embodiment, a server system is disclosed. The server system includes a memory configured to store instructions, a communication interface, and a processor configured to execute the instructions stored in the memory and thereby cause the server system to receive a communication request from a first user device associated with a first user, through a first communication point. The server system is configured to determine a first communication mode selected by the first user device through the first communication point. The server system is configured to determine a second communication mode selected by a second user device associated with a second user. The server system is further caused to process the communication request based, at least in part, on a matching between the first communication mode and the second communication mode. The server system is caused to initiate a communication session based, at least in part, on the processing step.

BRIEF DESCRIPTION OF THE FIGURES

For a more complete understanding of example embodiments of the present technology, reference is now made to the following descriptions taken in connection with the accompanying drawings in which.

Figure 1:
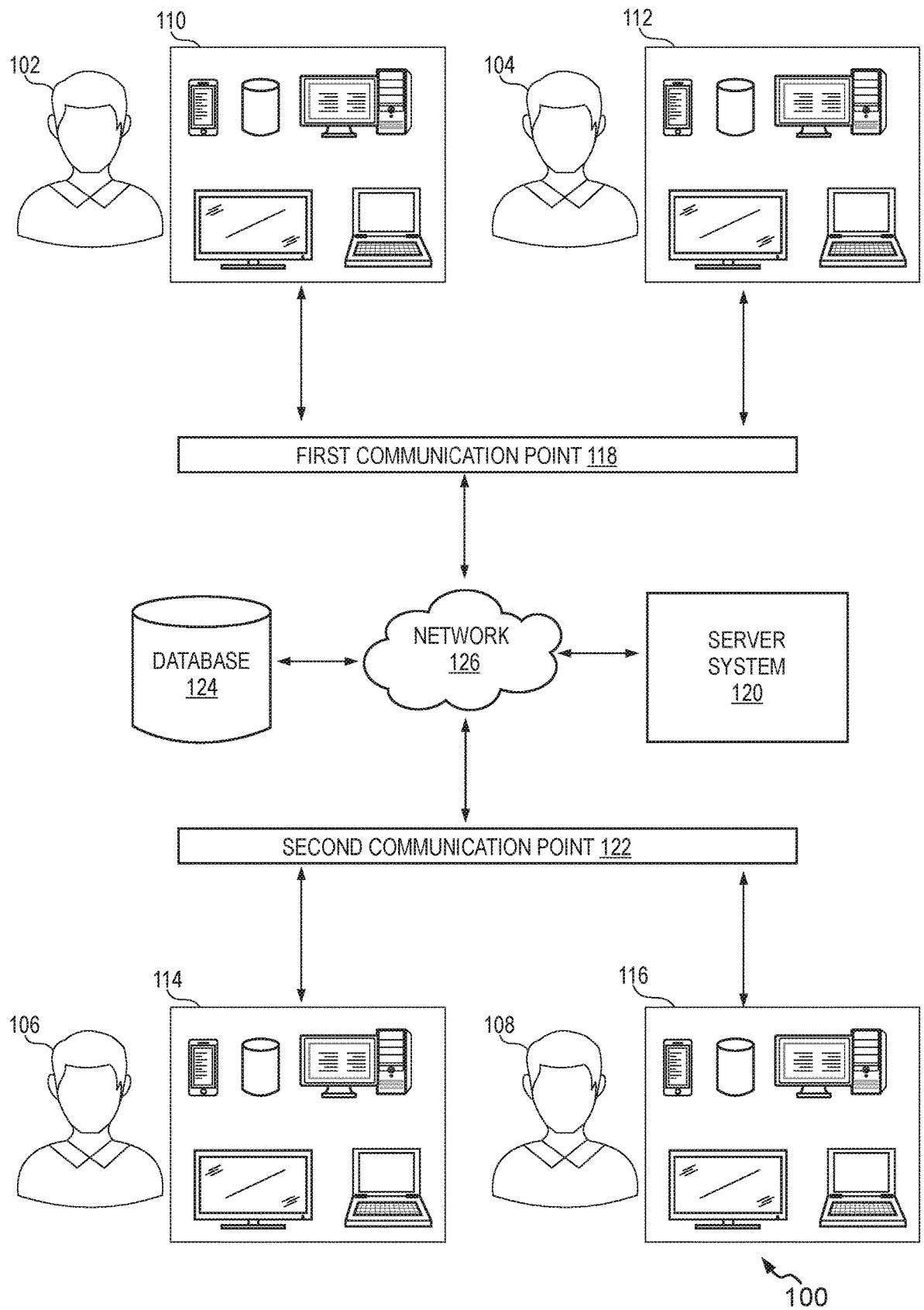
FIG. 1 is an example representation of an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for facilitating communication sessions between multiple communication points.

A context-to-call (C2C) application may be provided to the user devices as a plugin. The C2C application may be provided, by a server system configured to facilitate communication sessions between two or more communication points associated with the user devices. In an embodiment, all the devices included for a communication session may be enabled with the C2C feature. The C2C feature may also be developed by a third-party platform or downloaded from a third-party server in some embodiments. The C2C application enables a plurality of features such as context analysis, sentiment analysis, etc.

In an embodiment, the server system is configured to facilitate the users to initiate a communication request. The communication request may be associated with a communication session between a user device through a first communication point and another user device through a second communication point. In an embodiment, the users may be facilitated to download the C2C application provided by the server system onto the user devices. The C2C application may include a plurality of options that facilitates the users to initiate a communication with the user devices.

In an embodiment, the server system is configured to facilitate the users to download the suitable version of the C2C application based on the type of user devices. For example, the server system may facilitate a C2C desktop application if the user devices are desktops or laptops. In another example, the user device may be a smartphone or a smart speaker. The C2C application may be provided as a mobile application or as a smart speaker application respectively.

In an example, the server system is further configured to receive a communication request from the user device through the first communication point. The communication request may be initiated by using the C2C application on the user device. The first communication point may be one of, but not limited to, a C2C chatbot plugin, a C2C mobile application, a C2C smart TV application, a C2C browser plugin, C2C business mobile application, and C2C desktop application. The user may select a communication mode during the initiation process such as a video call, voice call, voice note, IM, short message service (SMS), an email, etc. In some embodiments, a third party different chatbot application may be used as the first communication point.

In one embodiment, the server system is configured to determine a communication mode selected by the user device. The communication mode may be one of a video call, an audio call, an email, or the like. Further, the server system is configured to identify another communication mode. The other communication mode may be selected by another user device associated with another user. The other communication mode may be one of a video call, an audio call, an email, or the like.

Furthermore, the server system is configured to process the communication request based on a matching between the two communication modes. The server system may simply initiate the communication request without any mode conversion if both the communication modes are the same. In cases where the communication modes are different, the server system may perform mode conversions and facilitate communication sessions between the two-communication point and second communication point.

In one embodiment, the server system is configured to transmit the communication request from one user device through the first communication point to another user device through the second communication point. The server system is further configured to initiate a communication session between the user devices through the first communication point and the second communication point.

In an embodiment, the first and the second communication points may be one of or a combination of an agent phone, a C2C agent mobile application, a third party agent mobile application, a C2C agent desktop application, a third party agent desktop application, an agent email, an agent smart speaker, a C2C agent website application, and a third party agent website application.

In one embodiment, the server system is configured to facilitate adding one or more user devices to a communication session that is already initiated between two users. One or more user devices may be added by any of the two users via the first communication point or the second communication point for creating a conference call. Further, multiple users present in the conference call may be allowed to communicate with each other via the communication points. Additionally, the communication modes selected by each of the multiple user devices in the conference call may be different.

In some additional embodiments where the first and/or second communication points are C2C or third party chatbot applications, the server system may facilitate a plurality of extra features such as context analysis, product recommendations, Natural language interpretation and translations. Further, sentiment analysis and urgency analysis may also be facilitated by the server system, based on a pre-defined set of interaction data stored in the database.

In an example embodiment, the server system may receive a message from the user device through the first communication point. The communication modes selected by the user devices for communication may be an audio call and a text message respectively. Since the communication modes are different, the server system is configured to convert the format of the message in accordance with the communication modes selected by the user devices for communication. Further, the server system is configured to send the converted message to the second communication point which may be viewed on the user device, through the second communication point.

Various embodiments of the present disclosure offer multiple advantages and technical effects. For instance, the present disclosure provides a single platform that is being able to make communication sessions possible between multiple communication points being used in multiple communication modes. In some embodiments, the present disclosure provides various context-to-call features such as context analysis, sentiment analysis, urgency analysis, etc. Such intelligent features may be used by business entities and/or call centres for serving their customers better and fast. In an embodiment, the present disclosure provides options for the user to select the data that is accessible by the server system or any third-party servers. This enables data security for the users and provides privacy to sensitive data. Further, in embodiments where the users allow to access their data, the present disclosure provides a system that is configured to provide recommendations to the users based on their conversation history and the information that they chose to share with the server system.

FIG. 1 is an example representation of an environment 100 related to at least some examples of the present disclosure. Although the environment 100 is presented in one arrangement, other embodiments may include the parts of the environment 100 (or other parts) arranged otherwise depending on, for example, facilitating a communication session between multiple communication points operating in different communication modes. The example of multiple communication points may include, but not limited to, chatbot plugins, mobile application, web application, smart speaker application, etc. The examples of different communication modes may include, but not limited to, video call, audio call, text message, instant messages (IMs), or voice notes. The environment 100 generally includes a plurality of users 102, 104, 106 and 108 associated with a plurality of user devices 110, 112, 114, and 116 respectively, a first communication point 118, a server system 120, a second communication point 122 and a database 124 each connected to, and in communication with (and/or with access to) a network 126. Only two communication points 118 and 122 are shown for representation purposes only, and there may be many such communication points. The network 126 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 126 in accordance with various wired and wireless communication protocols, such as, Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. The network 126 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 126 may include multiple different networks, such as a private network made accessible by the first communication point 118, the server system 120, the second communication point 122, and the database 124 separately, and/or a public network (e.g., the Internet) through which the first communication point 118, the server system 120, the second communication point 122, and the database 124 may communicate.

It should be noted that the number of users, user devices and the communication points described herein are only used for exemplary purposes and do not limit the scope of the invention. The main objective of the invention is to provide a single platform that is able to make communication sessions possible between multiple communication points being used in multiple communication modes.

The user devices 110-116 may be one of, but not limited to, a mobile phone, a smart speaker, a desktop, a smart television, and a laptop. The plurality of user devices 110-116 is configured to download or use a context-to-call (C2C) platform facilitated by the server system 120. The context-to-call feature may be enabled on any digital device, wherein the context-to-call feature may be incorporated according to the configuration supported by the user devices 110-116. The context-to-call connection may be hosted within the premises of an organization or a private/public cloud.

In an embodiment, the users 102 and 104 may be customers and the users 106 and 108 may be an agents and/or representative at a business entity or a call center, appointed to provide service to the users 102 and 104. Further, user devices 114 and 116 may be devices installed at the business entity or a call center.

Customers, potential customers, or other end users such as the users 102 and 104 desiring to receive services from a contact center or business may initiate communication through multiple communication modes to the contact center via their user devices such as the user devices 110 and 112. Each of the user devices 110-116 may be a communication device conventional in the art, such as, for example, a telephone, wireless phone, smart phone, personal computer, electronic tablet, and/or the like. Users operating the user devices 110 and 112 may initiate, manage, and respond to telephone calls, emails, chats, text messaging, web-browsing sessions, and other multi-media transactions.

In an embodiment, the server system 120 is configured to facilitate communication sessions between the first communication point 118 and the second communication point 122. The server system 120 is configured to provide a context-to-call (C2C) application that acts as a single communication channel for connecting the user device 110 and 112 to the user devices 114 and 116. The server system 120 is configured to facilitate the one of the users 102 and 104 to initiate a communication request through the first communication point 118. The server system 120 is configured to determine a communication mode selected by the user on their respective user device. The selected mode of communication may be one of a video call, an audio call, a text message, an IM, or a voice note. The server system 120 is further configured to identify a communication mode selected by the one of the user devices 114 and 116 associated with the users 106 and 108 respectively.

In one embodiment, after the server system initiates a communication session in the first selected mode, the server system 120 may receive the communication request from the user device 110 to the user device 116 through the second communication point 122, wherein the user device 116 and the second communication point 122 are each enabled with the C2C feature. The server system 120 may then determine a second selected mode for communication, selected by the user device 116. The first and second communication modes may be one of a video call, an audio call, a text message, an instant message (IM), or a voice note.

After the first and second communication modes are determined by the server system 120, the server system 120 is configured to process the communication request by performing a matching of the first communication mode and the second communication mode. Matching of the first and second communication mode refers to checking if the first and second communication modes are the same or different. Depending on the matching step, the server system 120 is configured to transmit the communication request and initiate the communication system.

The server system 120 is configured to transmit the communication request initiated by one of the user devices 110 and 112 through the first communication point 118 to one of the user devices 114 and 116 through the second communication point 122. After the transmission, the server system 120 may initiate a communication session between the user devices through the first communication point 118 and the second communication point 122 respectively.

In one embodiment, the server system 120 is configured to convert the format of messages conveyed between the user devices in accordance with the communication modes selected on the user devices for communication.

In one example embodiment, the first communication point 118 may be for example, but not limited to, a chatbot plug-in, a mobile application, a smart appliance, a browser plug-in, a browser mobile application plug-in, a desktop application and the like. According to an embodiment, the components of the environment 100 using which services are provided, may be offered as cloud services using a subscription-based software as service (SaaS) application. Similarly, the second communication point 122 may be for example, but not limited to, an agent phone, an agent mobile application, an agent desktop application, an agent email, an agent smart speaker, an agent website application, and the like.

In an example embodiment, context-to-call client component may be configured to be incorporated to the first communication point 118 to connect and communicate with the second communication point 122, while the second communication point 122 is incorporated at the business entity or contact center. The server system 120 generates a unique ID when a business user or a contact center signs up for context-to-call service. The generated unique identifier (ID) is used for authenticating the context-to-call service requests from the second communication point 122 over the network. Network may facilitate communications and exchange of data between the end-users, the context-to-call application, the communication points and the contact center or business entity. Each network may be any type of network familiar to those skilled in the art that can support data communications using any of a variety of commercially-available communication channels.

The example database 124 is shown to be in operative communication with the server system 120 for illustration purposes. The database 124 may store CRM information, data related to user interactions with user devices 114 and 116 in the contact center, and the like. In addition to the engagement data, the database 124 may store data associated with the customer care centers. The data associated with the business entity or the contact center may be used to authenticate the context-to-call service requests directed to the second communication point 122 over the network 126.

In an additional embodiment, the server system 120 may allow multiple users to communicate with each other using multiple communication points. In an example, the server system 120 may initiate a communication session between the user device 110 through the first communication point 118 and the user device 116 through the second communication point 122. The user 108 present at the user device 116 may further connect to another user 106 with the user device 114 via the second communication point 122 creating a conference call.

In another example, the server system 120 may initiate a communication session between the user device 110 through the first communication point 118 and the user device 114 through the second communication point 122. Further, the user 102 may add another user 108 associated with the user device 116 using the user device 110 through first communication point 118 to communicate with the user device 110 through second communication point 122 creating a conference call.

Similarly, one or more user devices may be added to a communication session by the one or more users of the plurality of users 102-108 via at least one of the first communication point 118 and the second communication point 122 for creating conference calls. The addition of multiple user devices onto a communication session facilitates the multiple users to communicate with each other using multiple user devices via multiple communication points.

Figure 2A:
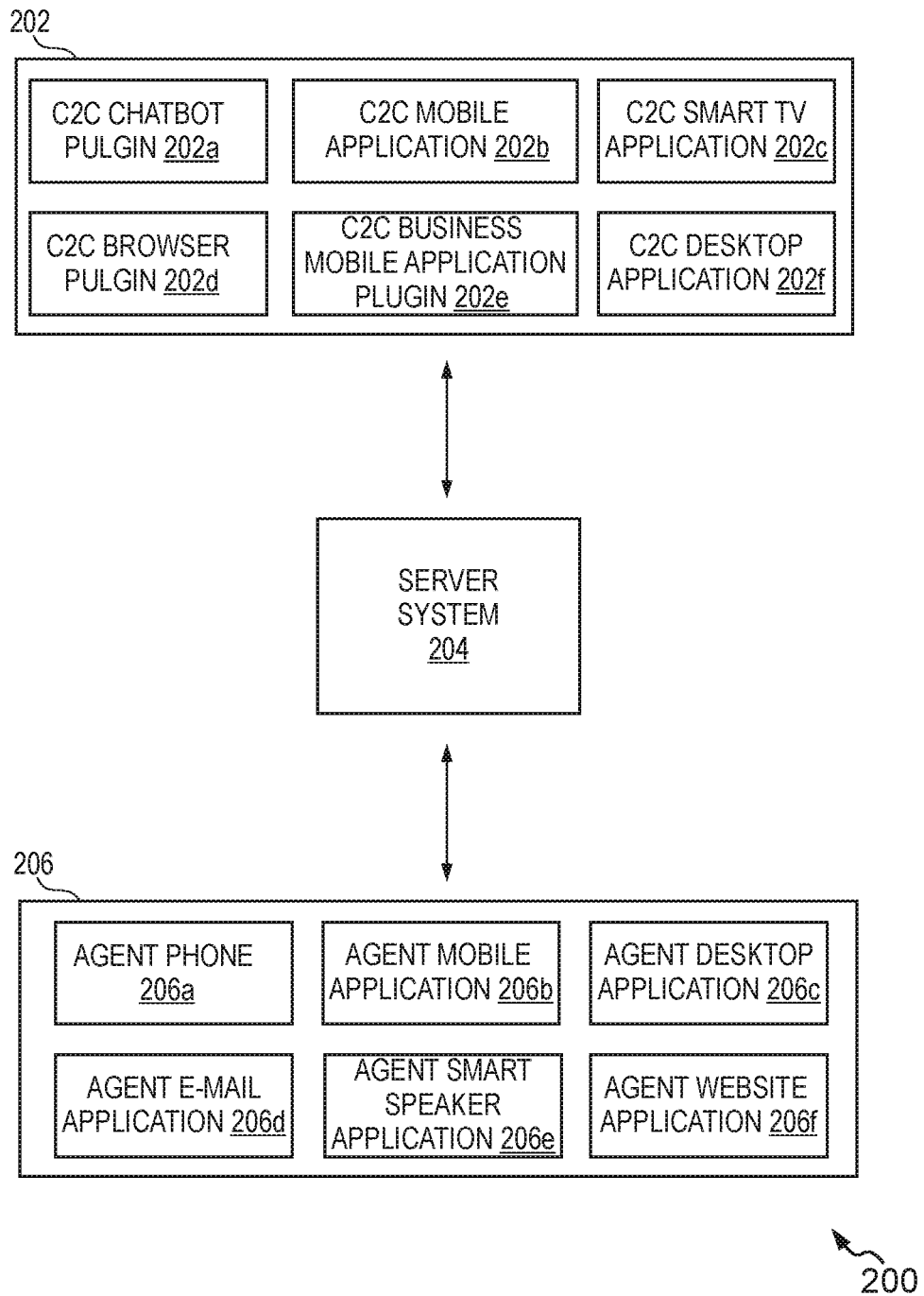
FIG. 2A is a block diagram for representing examples of multiple communication points, in accordance with an embodiment of the present disclosure.

FIG. 2A is a block diagram 200 of representing examples of multiple communication points, in accordance with an embodiment of the present disclosure. For example, the communication points may be first communication point 118 and the second communication point 122 as shown in FIG. 1. FIG. 2A is shown to include a first communication point 202, a server system 204, and a second communication point 206. The first communication point 202 may be similar to the first communication point 118 as described in FIG. 1. Similarly, the server system 204 and the second communication point 206 may be similar to the server system 120 and the second communication point 122 as described in FIG. 1.

In one embodiment, the server system 204 is configured to facilitate a communication session between the first communication point 202 and the second communication point 206. A communication request may be initiated by a user such as the first user 102 via the first user device 110, to initiate a communication session between the first communication point 202 and the second communication point 206 (the user 102 is hereinafter interchangeably referred to as "first user 102" & the user device 110 is hereinafter interchangeably referred to as "first user device 110).

It is exemplarily shown in FIG. 2A that the first communication point 202 may be one of a C2C chatbot plug-in 202a, a C2C mobile application 202b, a C2C smart TV application 202c, a C2C browser plug-in 202d, a C2C business mobile application plug-in 202e, and a C2C desktop application 202f. In an additional embodiment, when the first communication point is a C2C chatbot plug-in 202a, the plug-in may be a third party different chatbot framework. This means, the communication mode icons (e.g., voice call, video call, voice note, email, etc.) can be placed on any 3rd party chatbot framework. The third party chatbot framework may be, for example, but not limited to, Microsoft Chabot, Google Dialogflow, etc., that are available in the art.

Some exemplary scenarios of the first communication point 202 are described below as follows:

Web or App based Chatbot (Corresponding to C2C chatbot plug-in 202a): In case of a chatbot communication, the context-to-call feature may be configured to act as intelligent connector and may further include context analytics, an intelligent call routing, and recommendations, and a NL interpreter and translator. Further, the chatbot may communicate with multimodal conversion databases. Further, the context-to-call feature is incorporated as a plugin that provides the options to communicate through the chat by selecting the "Click-to-Voice Call" or "Click to Video Call" or "Click-to-SMS", or "Click-to-Mail" functionality provided therein. The icons may be enabled on the chatbot conditional to the availability of the agent based on the time or type of the issue and if the business user or admin has opted for the feature. The plugin supports:

a voice call, a video call and an instant message from a chatbot to a context-to-call feature enabled website, mobile application, desktop application and a smart speaker.

A text SMS from a chatbot to a mobile device.

An email from a chatbot to an email application.

iOS Application a voice call and a video call from the iOS context-to-call business application to a context-to-call feature enabled website, mobile application, desktop application and a smart speaker.

an instant message enabled from the iOS context-to-call business application to a context-to-call feature enabled website, mobile application, desktop application and a smart speaker.

Android Application a voice call and a video call from the android context-to-call business application to a context-to-call feature enabled website, mobile application, desktop application and a smart speaker.

an instant message enabled from the android context-to-call business application to a context-to-call feature enabled website, mobile application, desktop application and a smart speaker.

Web Browser (Corresponding to the C2C browser plug-in 202d): For a web browser, the context-to-call feature is incorporated as a browser plugin that is configured to seamlessly connect users and business entity or contact canter. The context-to-call platform requires the users to register in order to utilize all features of the context-to-call plugin and the information is stored onto a cloud server hosted by the server system 204. The users' information and business/contact canter information may be stored onto a third-party computing cloud platform such as, but not limited to, Microsoft Azure. In an alternate embodiment, where the database is residing on the user's premise such as the user device, the information may be stored locally at the user device. Then, the server system 210 will just be getting access into their database remotely. The plugin supports:

a voice call, a video call and an instant message from the browser to a context-to-call feature enabled website, mobile application, desktop application and a smart speaker.

a Text SMS from the browser to a mobile device.

an Email from the browser to an email application.

Voice: Smart speakers that are available in the art may be incorporated with a context-to-call feature that enables cross channel and cross speaker communication to help business entities gain an edge over their competitors.

Further, plugin on the chatbot may be configured to capture the following information (a) context of the interaction, (b) data from site analytics, (c) user specific details such as phone number, email etc. The logged information is collected and sent to the business entity or contact canter for expedited response. Such features of the server system are described in detail in FIG. 2B.

Similarly, it is exemplarily shown in FIG. 2A that the second communication point 206 may be one of an agent phone 206a, an agent mobile application 206b, an agent desktop application 206c, an agent email 206d, an agent smart speaker 206e, an agent website application 206f and the like. According to an exemplary scenario, for a business entity or a contact canter, the context-to-call platform enables a business owner or admin to choose the communication mode(s) accessible for the agent or customer representative. Some exemplary scenarios of the communication modes accessible by the agent are described below as follows:

Website (Corresponding to the agent website application 206f): The context-to-call feature incorporated at the second communication point 206 provides the following communicative features to the agent's mobile device:

A voice Call, a video call and an instant message received from the Web Browser, Business Website, Chabot, context-to-call/business mobile application, Smart Speaker to context-to-call Website Context-To-Call Business Mobile Application (Android &IOS) (Corresponding to the agent mobile application 206b): The context-to-call business application provides an additional communication channel for business entity. Particularly, in cases of a chatbot conversation, where the users are directed to an agent. The context-to-call plugin provides the options to communicate through the chat by selecting the "Click-to-Voice Call" or "Click to Video Call" or "Click-to-SMS", or "Click-to-Mail" functionality for registered users. The icons are enabled on the chatbot conditional to the availability of the agent based on the time or type of the issue and if the business user or admin has opted for the feature. The plugin supports:

1. iOS APP

Voice Call, video call and instant message received from the Web Browser, Business Website, Chabot, context-to-call/business mobile app, Smart Speaker to iOS context-to-call/business app.

2. Android

Voice Call, video call and instant message received from the Web Browser, Business Website, Chabot, context-to-call/business mobile app, Smart Speaker to an android context-to-call/business app.

3. Desktop

Voice Call, video call and instant message received from the Web Browser, Business Website, Chabot, Context-To-Call/business mobile app, Smart Speaker to Context-To-Call desktop application.

4. Voice

Voice Call, video call and instant message received from the Web Browser, Business Website, Chabot, Context-To-Call/business mobile app, Smart Speaker to a Voice Assistant.

Figure 2B:
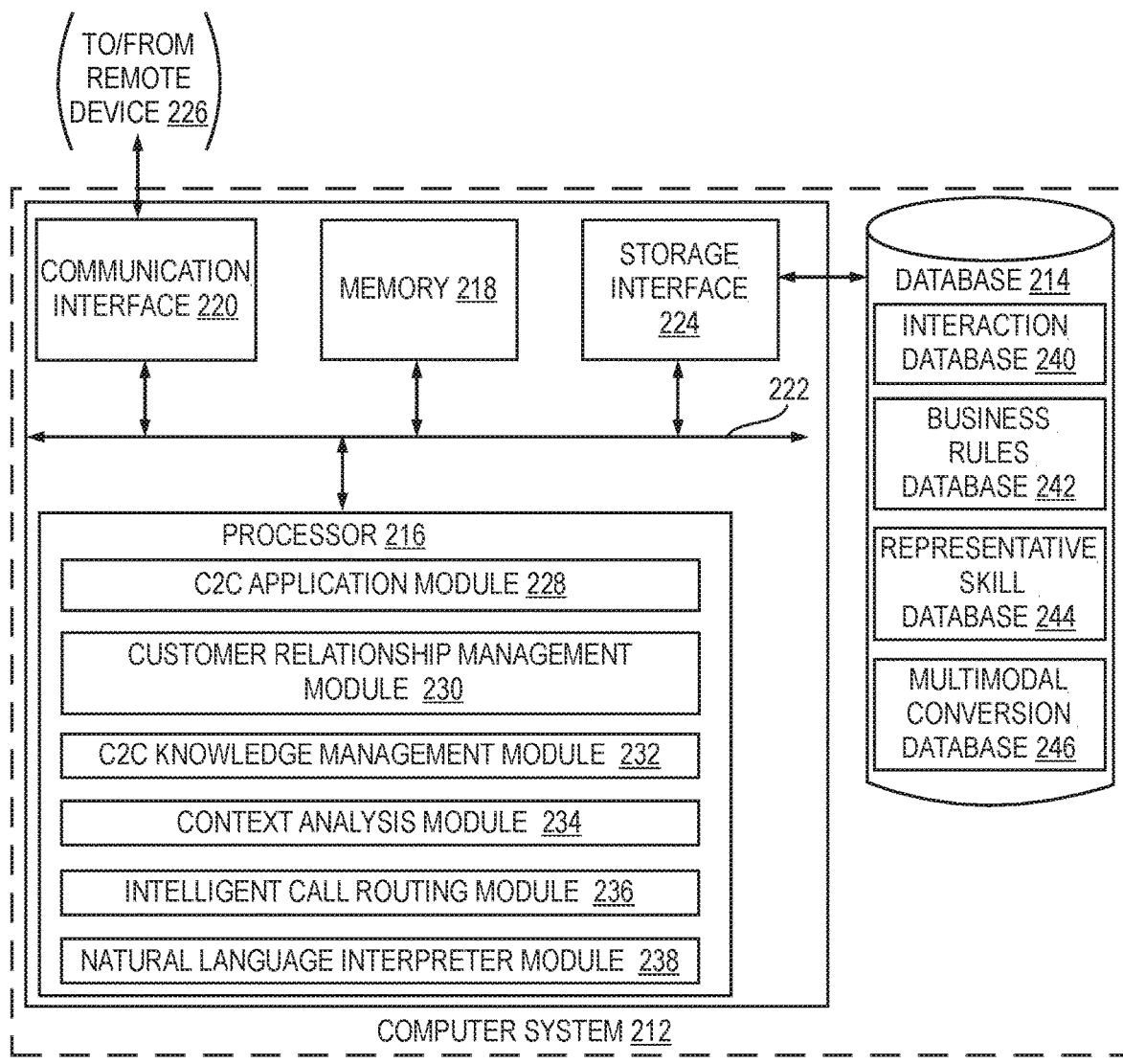
FIG. 2B is a simplified block diagram of a server system, in accordance with an embodiment of the present disclosure.

FIG. 2B is a simplified block diagram of a server system 210, in accordance with an embodiment of the present disclosure. For example, the server system 210 is similar to the server system 120 as described in FIG. 1. In some embodiments, the server system 210 is embodied as a cloud-based and/or SaaS-based (software as a service) architecture. The server system 210 is configured to facilitate a communication between the first communication point 202 and the second communication point 206 of FIG. 2A based on the selected modes for communication. In one embodiment, the server system 210 includes a computer system 212 and a database 214. The computer system 212 includes at least one processor 216 for executing instructions, a memory 218, and a communication interface 220. The one or more components of the computer system 212 communicate with each other via a bus 222.

In one embodiment, the database 214 is integrated within the computer system 212. For example, the computer system 212 may include one or more hard disk drives as the database 214. A storage interface 224 is any component capable of providing the processor 216 with access to the database 214. The storage interface 224 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 216 with access to the database 214. In one embodiment, the database 214 may include interaction database 240, business rules database 242, representative skill database 244, and multimodal conversion database 246.

The processor 216 includes suitable logic, circuitry, and/or interfaces to execute computer readable instructions for facilitating communication between the first communication point 202 and the second communication point 206, based on a communication request initiated by the first user 102 via the first user device 110. Examples of the processor 216 include, but are not limited to, an application-specific integrated circuit (ASIC) processor, a reduced instruction set computing (RISC) processor, a complex instruction set computing (CISC) processor, a field-programmable gate array (FPGA), and the like. The memory 218 includes suitable logic, circuitry, and/or interfaces to store a set of computer readable instructions for performing operations. Examples of the memory 218 include a random-access memory (RAM), a read-only memory (ROM), a removable storage drive, a hard disk drive (HDD), and the like. It will be apparent to a person skilled in the art that the scope of the disclosure is not limited to realizing the memory 218 in the server system 210, as described herein. In some embodiments, the memory 218 may be realized in the form of a database server or a cloud storage working in conjunction with the server system 210, without deviating from the scope of the present disclosure.

The processor 216 is operatively coupled to the communication interface 220 such that the processor 216 is capable of communicating with a remote device 226 such as, the first user device 110, first communication point 118, second user device 114, second communication point 122 or with any entity connected to the network 126 (e.g., as shown in FIG. 1). In one embodiment, the processor 216 is configured to facilitate a context-to-call application on the first user device 110 and the second user device 114 for enabling a plurality of functionalities to the devices described in the disclosure (the user 106 is hereinafter interchangeably referred to as "second user 106" & the user device 114 is hereinafter interchangeably referred to as "second user device 114").

It is noted that the server system 210 as illustrated and hereinafter described is merely illustrative of an apparatus that could benefit from embodiments of the present disclosure and, therefore, should not be taken to limit the scope of the present disclosure. It is noted that the server system 210 may include fewer or more components than those depicted in FIG. 2.

In one embodiment, the processor 216 includes a C2C application module 228, a customer relationship management (CRM) module 230, a C2C knowledge management module 232, a context analysis module 234, an intelligent call routing module 236, and a natural language (NL) interpreter module 238. The C2C application module 228 is configured to provide the C2C application onto the first user device 110 and the second user device 114. The C2C device on the first user device 110 and the second user device 114 may be different with corresponding functionalities for the users and the business representatives or agents. The C2C application may be completely downloaded on to the first user device 110 and the second user device 114 or in some embodiments, the C2C application may be remotely operated on the first user device 110 and the second user device 114 via the C2C application module 228. In some embodiments, the C2C application may be provided as a cloud-based service onto the first user device 110 and the second user device 114.

According to an embodiment, the contact center system or business manages resources (e.g., personnel, computers, and telecommunication equipment) to enable delivery of services via telephone or other communication mechanisms. Such services may vary depending on the type of contact center, and may range from customer service to help desk, telemarketing, order taking, and the like. Customers, potential customers, or other users desiring to receive services from the contact center or business may initiate communication through multiple communication modes to the contact center via their first user device 110. The first user device 110f may be a communication device conventional in the art, such as, for example, a telephone, wireless phone, smart phone, personal computer, electronic tablet, and/or the like. Users operating the end user devices may initiate, manage, and respond to telephone calls, emails, chats, text messaging, web-browsing sessions, and other multi-media transactions.

In an embodiment, the context-to-call application module 228 acts as a single communication channel for connecting the user devices to a contact center through the first communication point 118 and the second communication point 122. User devices are configured to support the first communication point 106, and the first communication point 118 is equipped to include a context-to-call feature, attribute, characteristic and the like capable of communicating over network to a context-to-call application module 228.

In one embodiment, the server system 200 is configured to facilitate adding one or more user devices to a communication session that is already initiated between two user devices such as 110 and 116. One or more user devices may be added by any of the two users via the first communication point 118 or the second communication point 122 for creating a conference call. Further, multiple users present in the conference call may be allowed to communicate with each other via the respective communication points.

The first communication point 118 may be for example, but not limited to, a chatbot plug-in, a mobile application, a smart appliance, a browser plug-in, a browser mobile application plug-in, a desktop application and the like as described earlier.

According to an embodiment, the processor 216 may be configured to facilitate initiation of communication session between the first communication point 118 and the second communication point 122, while the second communication point 122 is incorporated at the business entity or contact center.

In an embodiment, the processor 216 is configured to generate a unique ID when a business user or a contact center signs up for context-to-call service. The generated unique ID is used for authenticating the context-to-call service requests received from the second communication point 122.

The C2C application module 228 is configured to facilitate a plurality of users to create their account (email and password) on the C2C application downloaded on their user devices. The plurality of users may provide profile information to the application which may be stored under user profile section. The user profile information will have a unique ID that will be stored on the C2C application, but the consumer data will be reflected on the second communication point 206 for understanding the customer better. With this, the customer representative or the agent may not be required to ask the user about the regular consumer data. The representative/agent can directly start helping and solving the queries, having the consumer data already.

In one embodiment, the data related to the users will be specific, but not limited to, age, location, demographic, likes and dislikes, areas of interest, social media, educational background, unique identification number or personal information. Further, the user will be provided with options to hide the data if needed. In additional embodiments, financial information associated with the user such as recent payment details, and payment option details, may be fetched from various sources such as consumer accounts on 3rd party platforms, etc.

In an embodiment, the second communication point 122 may be for example, but not limited to, an agent phone, an agent mobile application, an agent desktop application, an agent email, an agent smart speaker, and the like as described earlier. The processor 216 is configured to facilitate communications and exchange of data between the users, the context-to-call application, the communication points 118 and 122, and the second user device 114 at the contact center or business entity.

The server system 210 may include an interaction database 240 that stores the user data and profile information of all the users such as the first user 102. The profile information of user may include an email address, first name, last name, phone number, unique ID/username, etc. The user data may include various interaction data collected by the server system during the usage of the C2C application by the users. The users may exclusively choose what profile information to be displayed at the second communication point 206.

Further, in case of the business or contact center, the interaction database 240 stores the business profile information such as business email address, various department phone numbers or location address associated with a plurality of business entities. The business entity or contact center user may choose the profile information to be accessible by the public.

In an embodiment, the server system 210 may include a customer relationship management (CRM) module 230 configured to maintain a historical data corresponding to an end-user, wherein the historical data includes information on prior interactions between the users and the business entity or contact center for enhanced retention of customers of a business entity or contact center.

Further, the server system 210 may include a business rules database 242 configured to store a plurality of business rules. In an example embodiment, one or more business rules are applied to determine whether to initiate communication session and control the customer interactions with the contact center or business entity. The business rules may include terms and conditions that may filter out spam calls and fake complaints coming to the contact centers.

In an embodiment, where the first communication point is a chatbot plug-in such as the C2C chatbot plug-in 202a, the server system 210 is configured to provide various functionalities based on the conversations of the users. The functionalities may include, context analysis, intelligent call routing, generation of customized recommendations etc. The processor 216 may utilize C2C knowledge management module 232, context analysis module 234, and intelligent call routing module 236 to enable such functionalities.

In an embodiment, the database 214 may include a representative skill database 244 that is configured to store the skill and expertise of a representative or an agent at the business entity or contact centre. In an embodiment, the intelligent call routing module 236 is configured to match a representative with the right department and the consecutive number for that particular department or match and allocate an appropriate customer representative or agent based on the context derived from the chatbot conversation by the context analysis module 234.

The knowledge management module 232 is configured to generate customized recommendations for the users based on the gathered information and the preferences of the users stored in the database 214.

In an embodiment, the natural language interpreter module 238 is configured to translate or interpret the text or voice in a message and provide translation and other suitable conversions to the messages. The natural language interpreter module 238 in the processor 216 is configured to translate and interpret the messages by utilizing the multimodal conversion database 246. The multimodal conversion database 246 may include a plurality of pre-defined set of interaction data that may be used to perform interpretation and translate messages conveyed between the first and second user devices.

Further, the processor 216 is configured to generate different kinds of reports. The reports may be used to train the agents and improve the services to serve the users better. In an embodiment, the processor 216 may include a report generating module (not shown in FIG. 2B) configured to generate a plurality of reports. The reports described below are associated with the calls made by the user to the second user device. Here the call is referred to as—audio, video, text, email, or any kind of communication carried out between the first and the second communication points 118 and 122. The reports generated include but not limited to:

Channel Engagement Report—This report represents the end-user engagement channel usage.

Context Detail Report—This report represents the count based on the context usage.

Call Duration Report—This report represents the call duration and number of calls made and/or received.

Context Duration Report—This report represents the contact duration for each context.

Call Response Report—This report represents the call responses, shows the status of the number of calls connected, dropped, busy and/or abandoned.

SMS Response Report—This report represents the SMS response, shows the status of the SMS responded, delivered, not delivered and/or abandoned.

Context-Channel Report—This report represents a comparative representation of the type of channel used for each context.

Originator location—This report includes the details of end-user location.

Call Recording—This report will provide call recording of the conversation that happens between the customer and representative. Here the call is referred to as—video, text, email, or any kind of communication between two communication points.

Sentiment Analysis—This report will provide sentimental analysis of the call conversation between customer and representative. The sentimental rating will range from angry to satisfied.

Real-Time Transcription—This report will perform transcription of the communications modes.

Real time transcription is a functionality that is enabled for any voice or video communication. When the first user connects with the second user, the communication is transcribed into text and stored in database for future references.

Further, the server system 210 may also include a sentiment parameter index analyser (not shown in FIG. 2B) that is configured to analyse the sentiment and urgency of the user's query based on the set of interactions. The calls are directed accordingly, in some embodiments. The sentiment analysis may be provided based on the keywords detected in the call and the positive or negative ranks may be provided to the corresponding keywords. Further, based on the ranking, sentiments of the users may be determined. An exemplary sentiment analysis data is shown in table 1 below.

TABLE 1

| Keyword | Ranking |
| --- | --- |
| Keyword 1: good | 1: Positive keyword |
| Keyword 2: angry | 0: Negative keyword |
| Keyword 3: lost | 0: Negative keyword |
| Keyword 4: not sure | 0: Negative keyword |
| Keyword 5: okay | 1: Positive keyword |

In additional embodiments, the server system 210 may also indicate the total expected wait time of the interaction to the users with colour codes. In an example, the first user 102 may call an agent using first communication point 118. Further, another user may call the same agent using another or same communication point. Simultaneously, four more users may call the same agent using different or same communication points. Therefore, all the six users except for the first user 102 will hear or see a caller busy ringtone or message.

For example, the first user 102 may talk to agent for 10 minutes. This means the wait time icon of 10 minutes may be shown to the other five users. In an embodiment, a red LED light or a beep on the user device may be shown to the other users. After 2 minutes, the colour may turn yellow, as the wait time is decreased. However, the colour will change only for the immediate next user in the queue. The rest of the other users will still see red colour indication as they are still in line. After five minutes, the call icon colour may turn green as the wait time has decreased even further. This process will continue further depending on the wait time of the call. In an embodiment, the processor 216 is configured to perform urgency analysis based on the keywords and the sentiments determined from the conversation. In an example scenario, the waiting time of a user may be reduced based on an urgency detected in the conversation.

Figure 3:
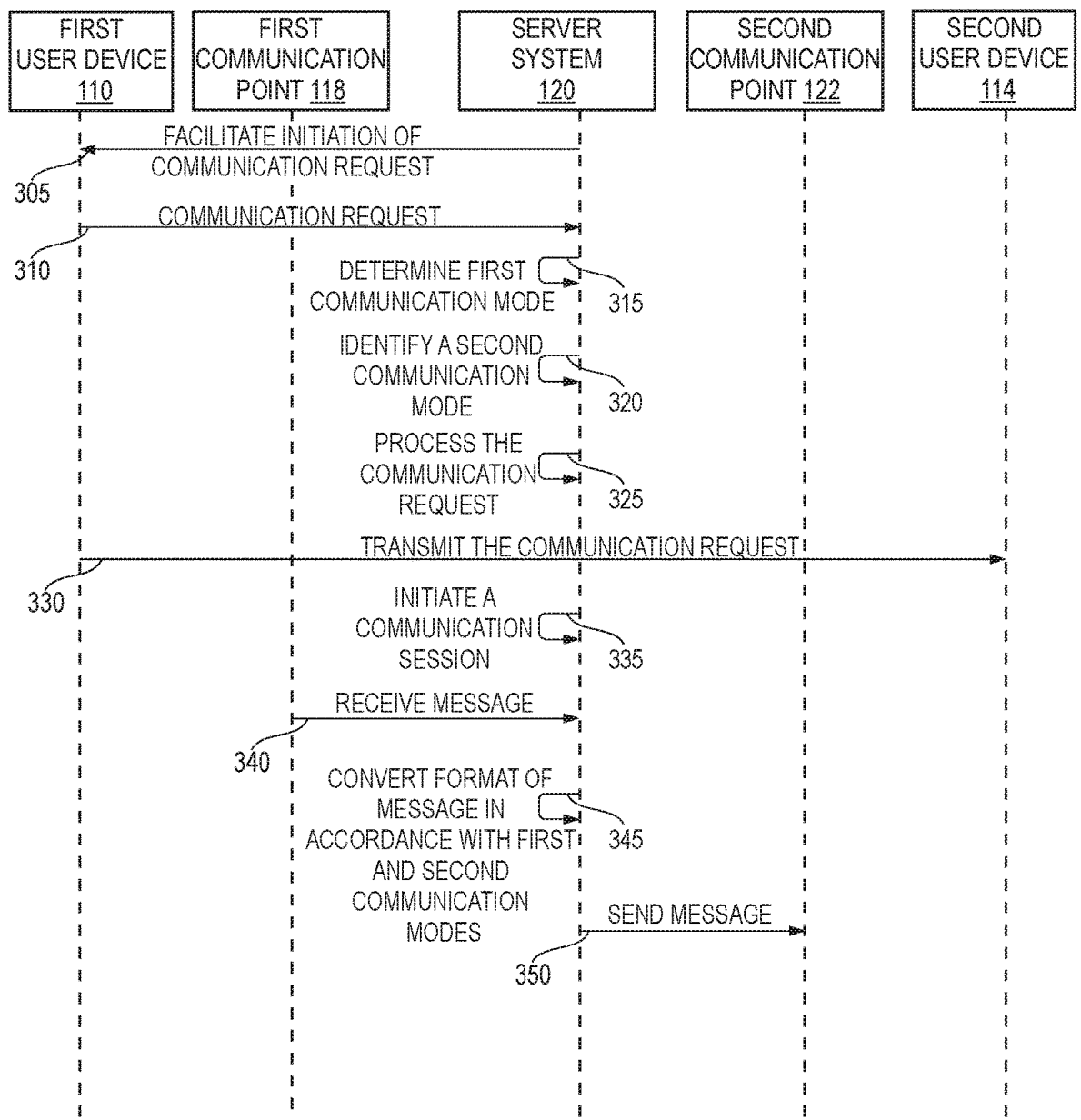
FIG. 3 is a sequence flow diagram for facilitating a communication session between two communication points, in accordance with an embodiment of the present disclosure.

FIG. 3 is a sequence flow diagram 300 for facilitating a communication session between two communication points (first communication point 118 and second communication pint 122) being used in one or more communication modes, represented in accordance with an example embodiment of the present disclosure. The communication session is facilitated via the server system 120 when the first user 102 initiates a communication request from the first communication point 118 to second communication point 122. The first user 102, the first communication point 118, the server system 120 and the second communication point 122 are described with reference to FIG. 1.

At 305, the server system 210 facilitates the first user 102 to initiate a communication request using a first user device 110. The communication request may be for starting a communication session between the first communication point 118 and the second communication point 122. In an embodiment, the first user device 110 may be facilitated to download the C2C application provided by the server system 210. The C2C application may include a plurality of options that facilitates the first user 102 to initiate a communication with a second user device 114.

At 310, the server system 210 receives a communication request from the first user device 110, through the first communication point 118. The communication request may be initiated using the C2C application. The first communication point 118 may be one of, but not limited to, a C2C chatbot plug-in 202a, a C2C mobile application 202b, a C2C smart TV application 202c, a C2C browser plugin 202d, C2C business mobile application plugin 202e, and C2C desktop application 202f. The first user 102 may select a communication mode during the initiation process such as a video call, voice call, voice note, IM, short message service (SMS), an email, etc. In some embodiments, a third party different chatbot application (not shown in the figures) may be used as the first communication point 118.

At 315, the server system 210 determines a first communication mode for communication, selected by the first user device 110. The first communication mode may be one of a video call, an audio call, an email, or the like.

At 320, the server system 210 identifies a second communication mode for communication. The second communication mode for communication may be selected by the second user device 114. The second communication mode may be one of a video call, an audio call, an email, or the like.

At 325, the server system 210 processes the communication request based on a matching between the first communication mode and the second communication mode. The server system 120 may simply initiate the communication request without any mode conversion if the first communication mode and the second communication modes are the same. In cases where the first and second communication modes are different, the server system 120 may perform mode conversions and facilitate communication sessions between the first communication point 118 and second communication point 122.

At 330, the server system 210 transmits the communication request from the first user device 110 through the first communication point 118 to the second user device 114 through the second communication point 122. At 335, the server system 120 may initiate a communication session between the first user device 110 through the first communication point 118 and the second user device 114 through the second communication point 122.

At 340, the server system 210 receives a message from the first communication point 118. In an example, the first communication mode selected by the first user device 110 and the second communication mode selected by the second user device 114 for communication may be an audio call and a text message respectively.

At 345, the server system 210 converts the format of the message in accordance with the first and second communication modes selected by the first and second user devices for communication. The intelligent call routing module 236 and the NL interpreter module 238 of FIG. 2B may facilitate the server system 120 to change the format of the message in accordance to the selected modes for communication.

At 350, the server system 210 sends the converted message to the second communication point 122 which may be viewed on the second user device 114 (not shown in FIG. 3), through the second communication point 122. The steps described at 340-350 may also be repeated in the scenarios where the second communication point 122 is sending messages to the first communication point and vice versa.

FIGS. 4A-4D are simplified block diagrams representing a plurality of possible communication sessions, in accordance with an embodiment of the present disclosure. It is exemplarily shown in FIGS. 4A, 4B, 4C, and 4D, the block diagrams 400, 420, 440, 460 respectively. The block diagrams are shown including a server system 402 that is configured to initiate communication sessions between the first user devices 404 and the second user devices 406 present at business entity 408. The possible communication modes 410 are exemplarily shown in the FIGS. 4A-4D. In an example, the possible communication modes may be a voice call, video call, audio note, SMS, IM, email, calendar, payment gateway, etc. The first and second user devices may be, but not limited to, a mobile phone, a smart speaker, a desktop, a smart television, and a laptop. The plugin 412 indicates that the context-to-call application provided by the server system 120 is integrated with the business entity 408 as a software, for example website, operating system-based application, and the like. The settings 414 indicate that the context-to-call feature may be developed by the business entity 408 itself.

Figure 4A:
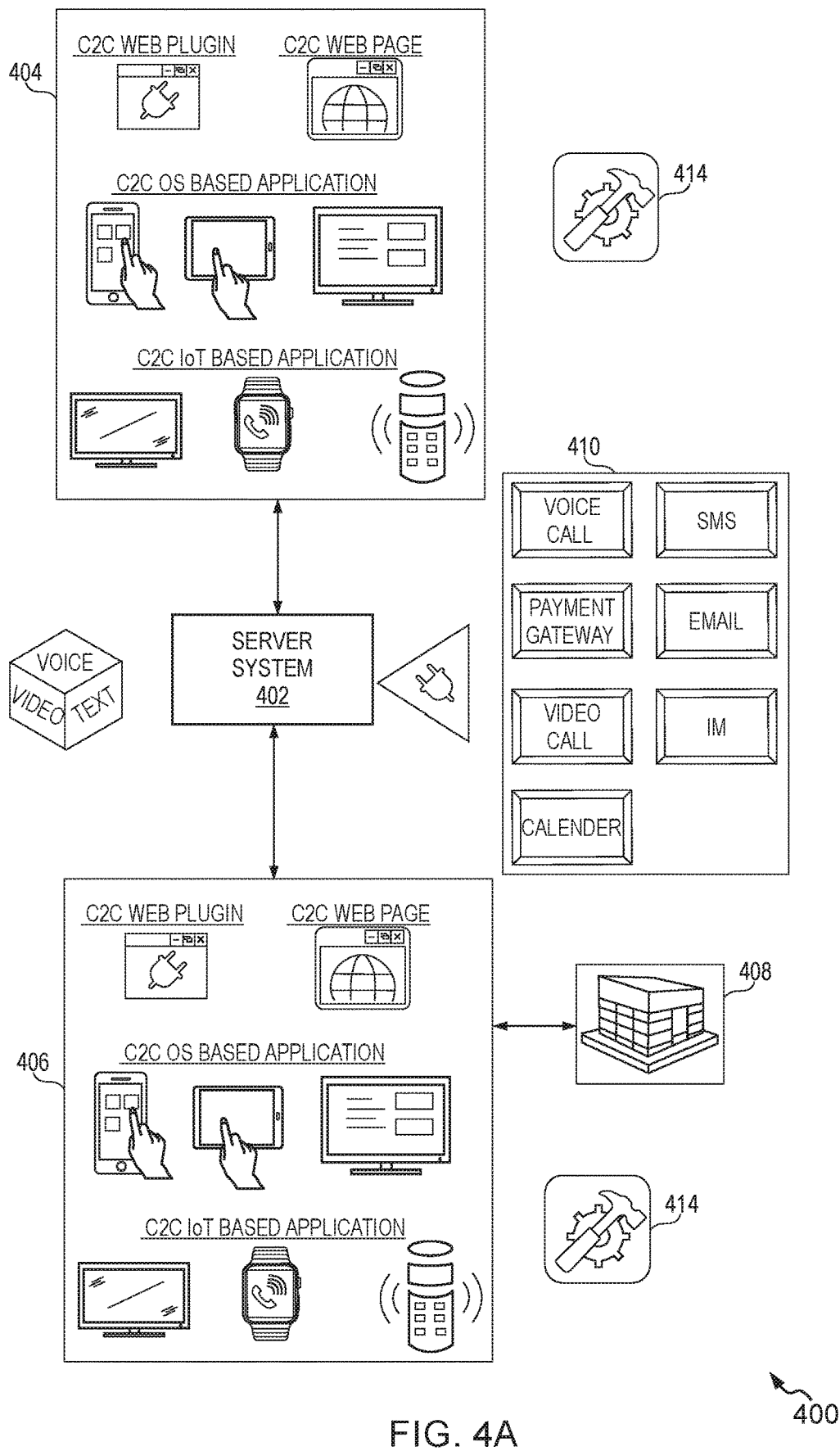
FIGS. 4A-4D are simplified block diagrams representing a plurality of possible communication sessions, in accordance with an embodiment of the present disclosure.

FIG. 4A is a block diagram 400 including the server system 402 configured to initiate communication sessions between the first user devices 404 and the second user devices 406. The scenario depicted in the FIG. 4A is exemplarily shown to include the settings 414 for both the first user devices 404 and the second user devices 406. The settings 414 represent that the C2C feature on the first user devices 404 and second user devices 406 are developed by the platforms such as third-party servers associated with the business entities such as the business entity 408.

Figure 4B:
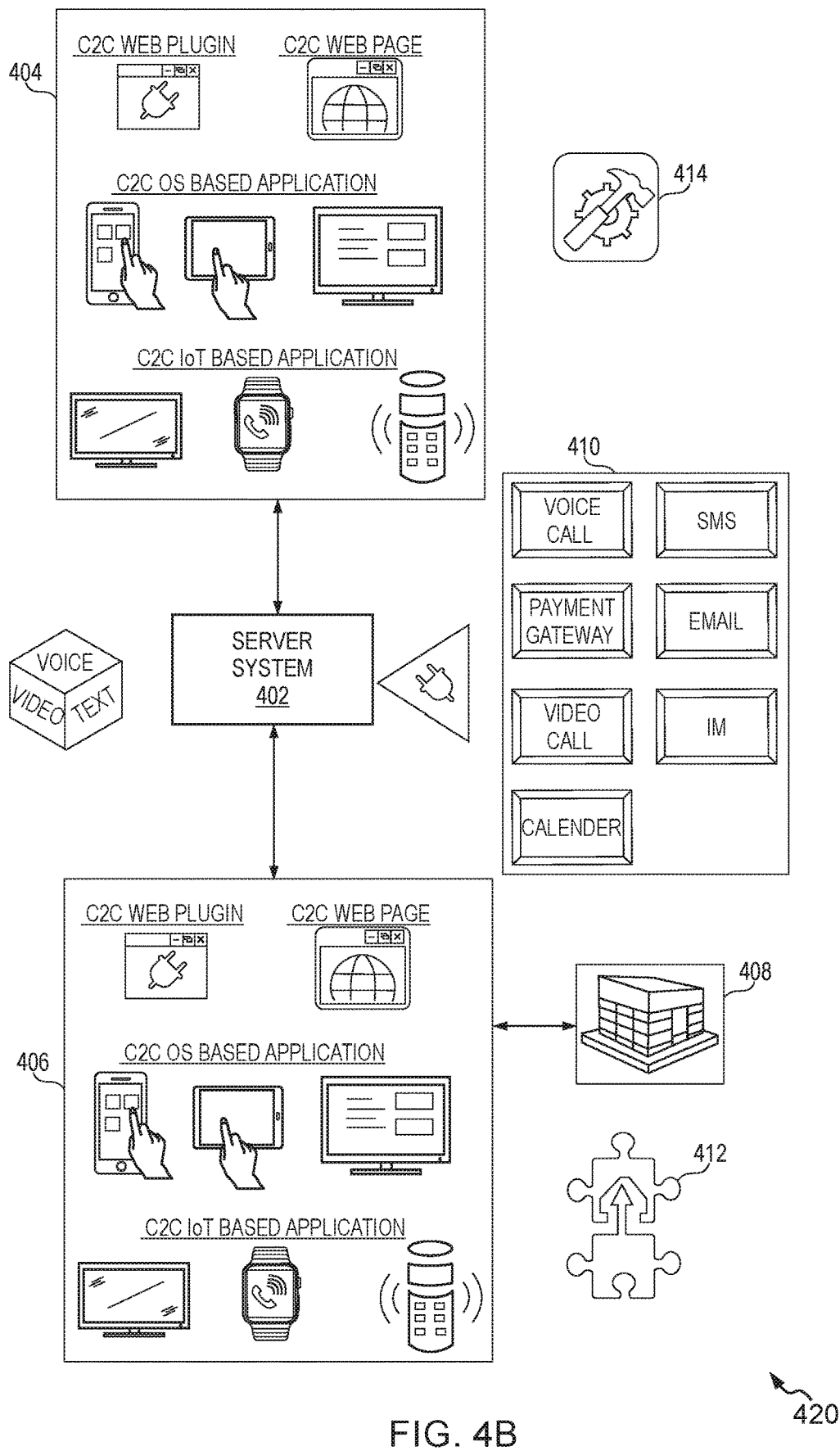

Similarly, FIG. 4B is a block diagram 420 including the server system 402 configured to initiate communication sessions between the first user devices 404 and the second user devices 406. The scenario depicted in the FIG. 4B is exemplarily shown to include the settings 414 for the first user devices 404 and plugin 412 second user devices 406. The settings 414 represent that the C2C feature on the first user devices 404 is developed by the platforms such as third-party servers associated with the business entities such as the business entity 408. The plugin 412 represents that the C2C feature on the second user devices is provided by the server system 402 to the second user devices 406 as a software or cloud service.

Figure 4C:
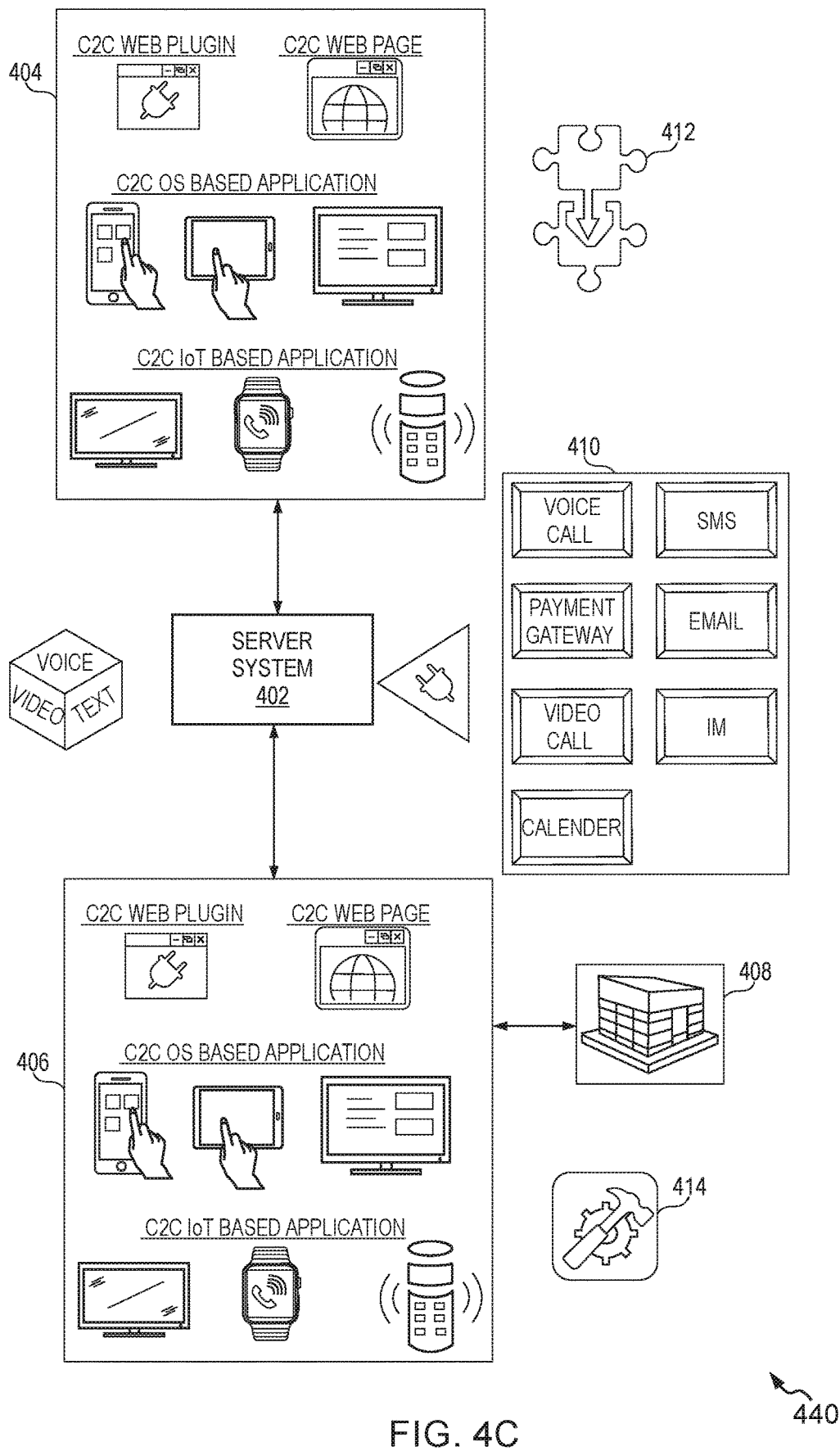

Similarly, FIG. 4C is a block diagram 440 including the server system 402 configured to initiate communication sessions between the first user devices 404 and the second user devices 406. The scenario depicted in the FIG. 4C is exemplarily shown to include the plugin 412 for the first user devices 404 and the settings 414 for the second user devices 406. The plugin 412 represents that the C2C feature on the first user devices 404 is provided by the server system 402 to the second user devices 406 as a software or cloud service. The settings 414 represent that the C2C feature on the second user devices 406 is developed by the platforms such as third-party servers associated with the business entities such as the business entity 408.

Figure 4D:
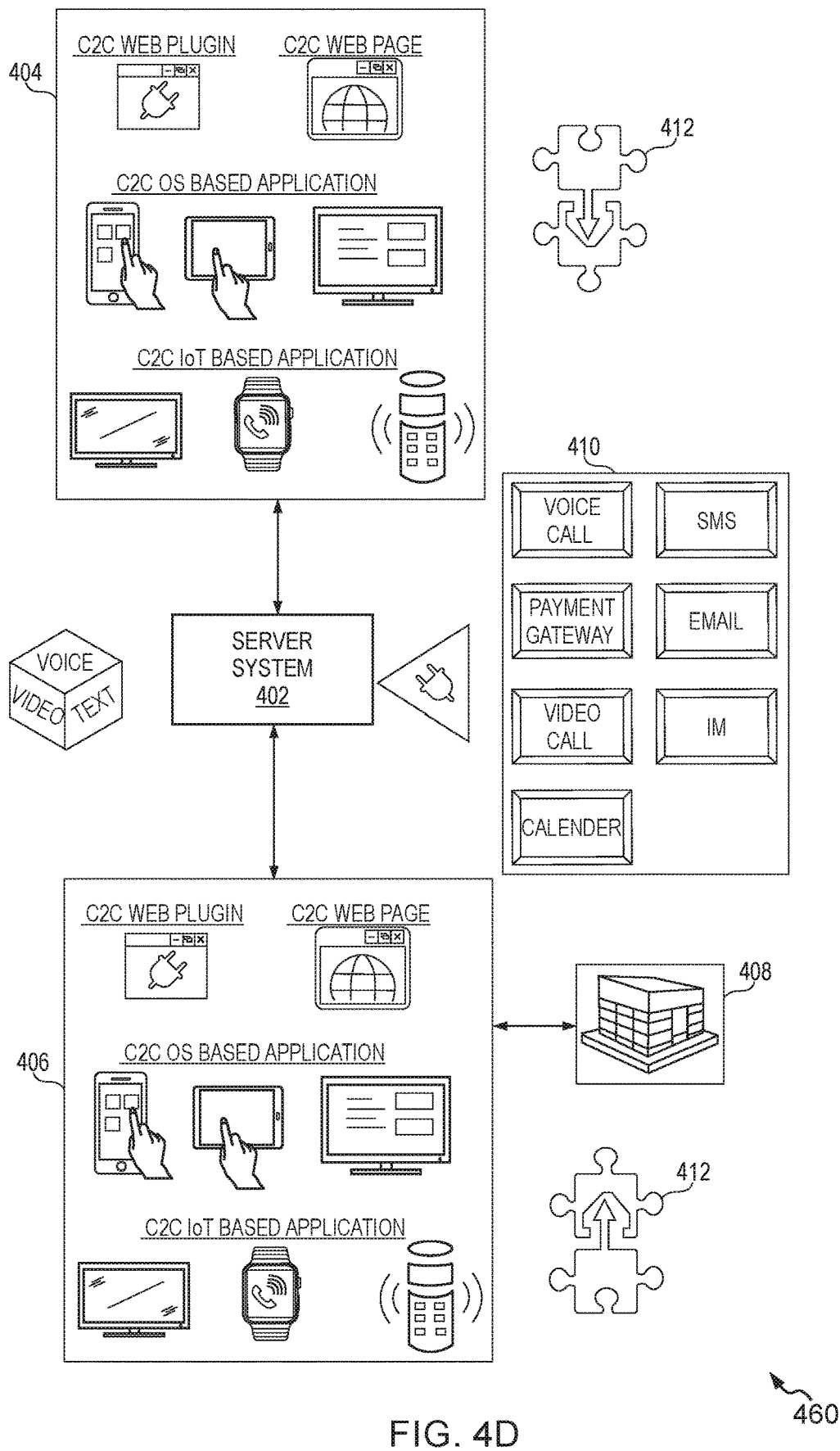

Similarly, FIG. 4D is a block diagram 460 including the server system 402 configured to initiate communication sessions between the first user devices 404 and the second user devices 406. The scenario depicted in the FIG. 4D is exemplarily shown to include the plugin 412 for both first user devices 404 and second user devices 406. The plugin 412 represents that the C2C feature on the first user devices 404 and second user devices 406 may be provided by the server system 120 as a software, for example website, operating system-based application, and the like.

As discussed in FIGS. 4A-4D, there is a plurality of possible combinations of first and second communication points for facilitating communication sessions. The table 2 shown below includes all the possible combinations of the first and second communication points that can be used for facilitating communication between them.

TABLE 2

| First communication point | Second communication point |
| --- | --- |
| 3rd Party Website | Agent Phone/Landline |
| 3rd Party Website | Agent Mobile application |
| 3rd Party Website | Agent Desktop application |
| 3rd Party Website | Agent email application |
| 3rd Party Website | Agent party smart speaker |
| 3rd Party Website | Agent website application |
| C2C or 3rd party Desktop Application | Agent Phone/Landline |
| C2C or 3rd party Desktop Application | Agent Mobile application |
| C2C or 3rd party Desktop Application | Agent Desktop application |
| C2C or 3rd party Desktop Application | Agent email application |
| C2C or 3rd party Desktop Application | Agent party smart speaker |
| C2C or 3rd party Desktop Application | Agent website application |
| C2C or 3rd party Browser Plugin | Agent Phone/Landline |
| C2C or 3rd party Browser Plugin | Agent Mobile application |
| C2C or 3rd party Browser Plugin | Agent Desktop application |
| C2C or 3rd party Browser Plugin | Agent email application |
| C2C or 3rd party Browser Plugin | Agent party smart speaker |
| C2C or 3rd party Browser Plugin | Agent website application |
| C2C or 3rd party Speaker App | Agent Phone/Landline |
| C2C or 3rd party Speaker App | Agent Mobile application |
| C2C or 3rd party Speaker App | Agent Desktop application |
| C2C or 3rd party Speaker App | Agent email application |
| C2C or 3rd party Speaker App | Agent party smart speaker |
| C2C or 3rd party Speaker App | Agent website application |
| C2C or 3rd party Smart TV | Agent Phone/Landline |
| C2C or 3rd party Smart TV | Agent Mobile application |
| C2C or 3rd party Smart TV | Agent Desktop application |
| C2C or 3rd party Smart TV | Agent email application |
| C2C or 3rd party Smart TV | Agent party smart speaker |
| C2C or 3rd party Smart TV | Agent website application |
| C2C or 3rd party Mobile App | Agent Phone/Landline |
| C2C or 3rd party Mobile App | Agent Mobile application |
| C2C or 3rd party Mobile App | Agent Desktop application |
| C2C or 3rd party Mobile App | Agent email application |
| C2C or 3rd party Mobile App | Agent party smart speaker |
| C2C or 3rd party Mobile App | Agent website application |
| C2C or 3rd party Chatbot | Agent Phone/Landline |

TABLE 2-continued

| First communication point | Second communication point |
| --- | --- |
| C2C or 3rd party Chatbot | Agent Mobile application |
| C2C or 3rd party Chatbot | Agent Desktop application |
| C2C or 3rd party Chatbot | Agent email application |
| C2C or 3rd party Chatbot | Agent party smart speaker |
| C2C or 3rd party Chatbot | Agent website application |

FIGS. 5A to 5F collectively represent example scenario representations 500, 520, 540, 560, 580, and 590 respectively, depicting all the possible communications using a third-party browser plugin as a first communication point. The six possible scenarios depict the environment of each communication session between a C2C or a third-party browser plugin 502 as a first communication point. The server system 506 is configured to initiate communication session between a C2C or third-party browser plugin 502 and a second communication point. The second communication point may be one of, but not limited to an agent telephone/landline, an agent mobile application, an agent desktop application, an agent website application, third party speaker application, an agent email application, and the like.

Figure 5A:
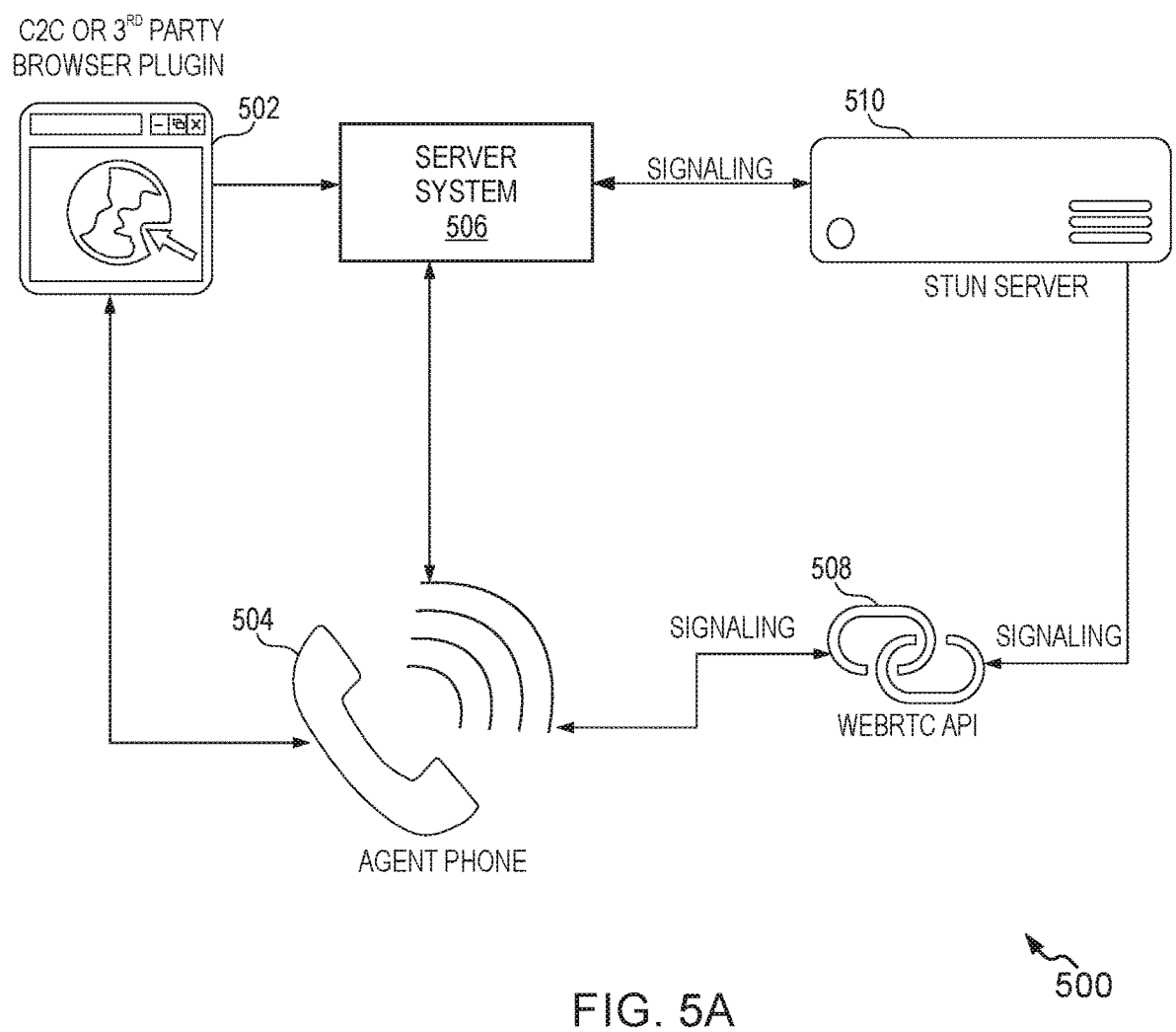
FIG. 5A is a representation depicting a communication between a third-party browser plugin and an agent phone, in accordance with an embodiment of the present disclosure.

FIG. 5A is a representation 500 depicting a communication between a C2C or third-party browser plugin 502 and an agent phone 504, in accordance with an embodiment of the present disclosure. The server system may facilitate various functionalities based on the communication modes chosen by the users on the C2C or third-party browser plugin 502 and the agent phone 504. In an example embodiment, the user associated with the C2C or third-party browser plugin 502 may initiate a communication request via a C2C application or a third-party web application on a user device such as the first user device 110. The server system 506 may determine a first communication mode selected by the user on the C2C or third-party browser plugin 502 and the second communication mode of the agent phone 504. In the example, the first communication may be a video call and the second communication mode may be an audio call. A WebRTC application programming interface (API) 508 is a framework that may be used for real-time communication for web browsers or web plugins. It supports video, voice and generic data sent between the C2C or third-party browser plugin 502 and the agent phone 504. The webRTC API 508 is an open source framework available in the art which allows the developers to build voice and video communication platforms.

Further a STUN server 510 may also be utilized by the server system 506 to facilitate the communication session. STUN stands for session traversal of user datagram. This is a standardized network protocol for traversal of network address translator (NAT) which acts as a gateway for applications of real-time voice, video, messaging, and other interactive communication. More particularly, the C2C or third-party browser plugin 502 may initiate a voice over internet protocol (VoIP) using WebRTC API 508 that hits the STUN server 510 which acts as a gateway to carry the call further to agent phone 504.

Figure 5B:
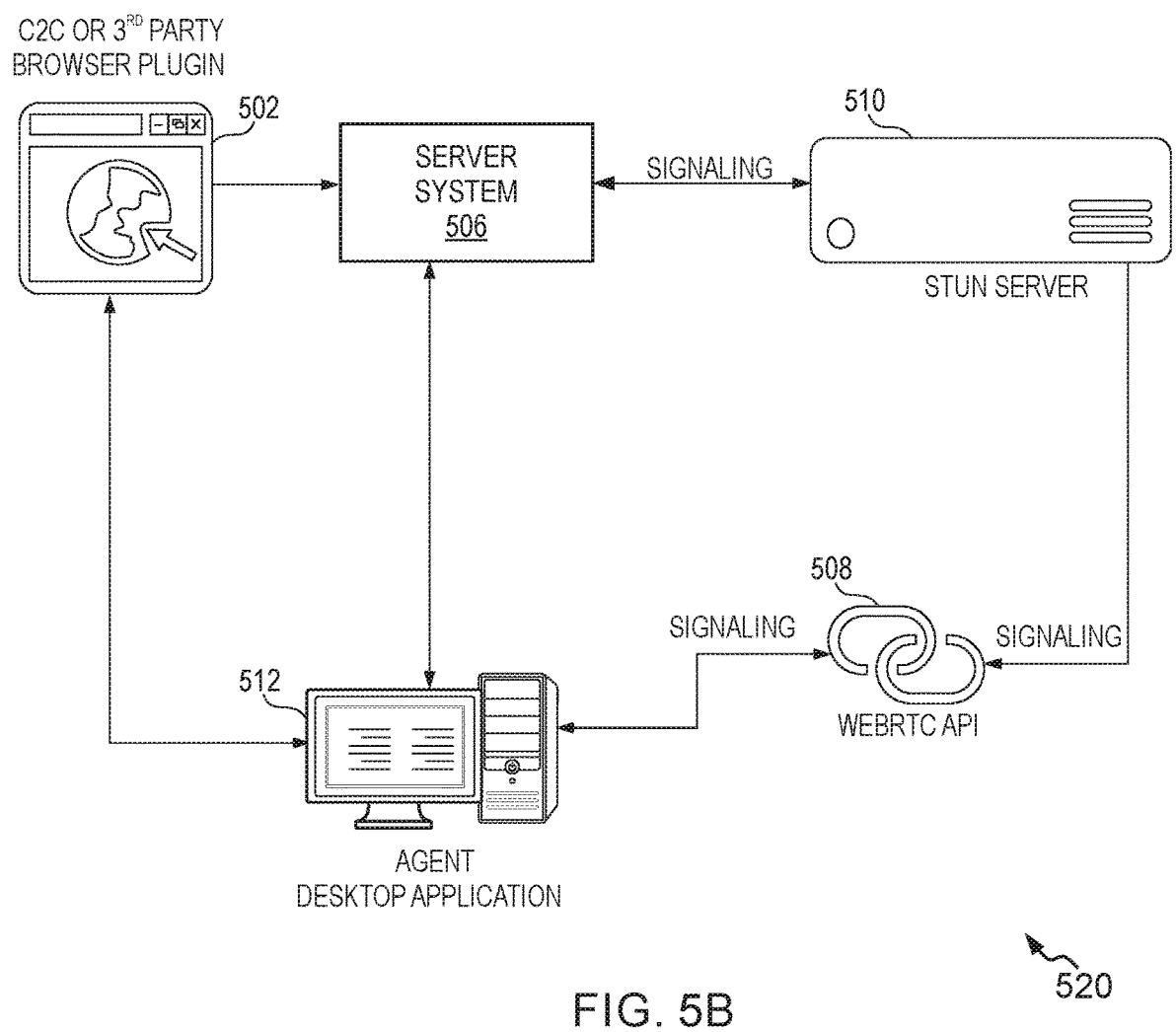
FIG. 5B is a representation depicting a communication between a third-party browser plugin and a third-party browser application, in accordance with an embodiment of the present disclosure.

FIG. 5B is a representation 520 depicting a communication between a C2C or third-party browser plugin 502 and an agent desktop application 512, in accordance with an embodiment of the present disclosure. The agent desktop application 512 may be enables with the C2C feature. The server system 506 may facilitate various functionalities based on the communication modes chosen by the users on the C2C or third-party browser plugin 502 and the agent desktop application 512. In an example embodiment, the user associated with the C2C or third-party browser plugin 502 may initiate a communication request via a C2C application or a third-party web application on a user device such as the first user device 110. The server system 506 may determine a first communication mode selected by the user on the C2C or third-party browser plugin 502 and the second communication mode of agent desktop application 512. In the example, the first communication may be a video call and the second communication mode may be an instant message (IM). A WebRTC API 508 and the STUN server 510 may be utilized by the server system 506 to facilitate the communication session between the C2C or third-party browser plugin 502 and an agent desktop application 512, as discussed in FIG. 5A.

Figure 5C:
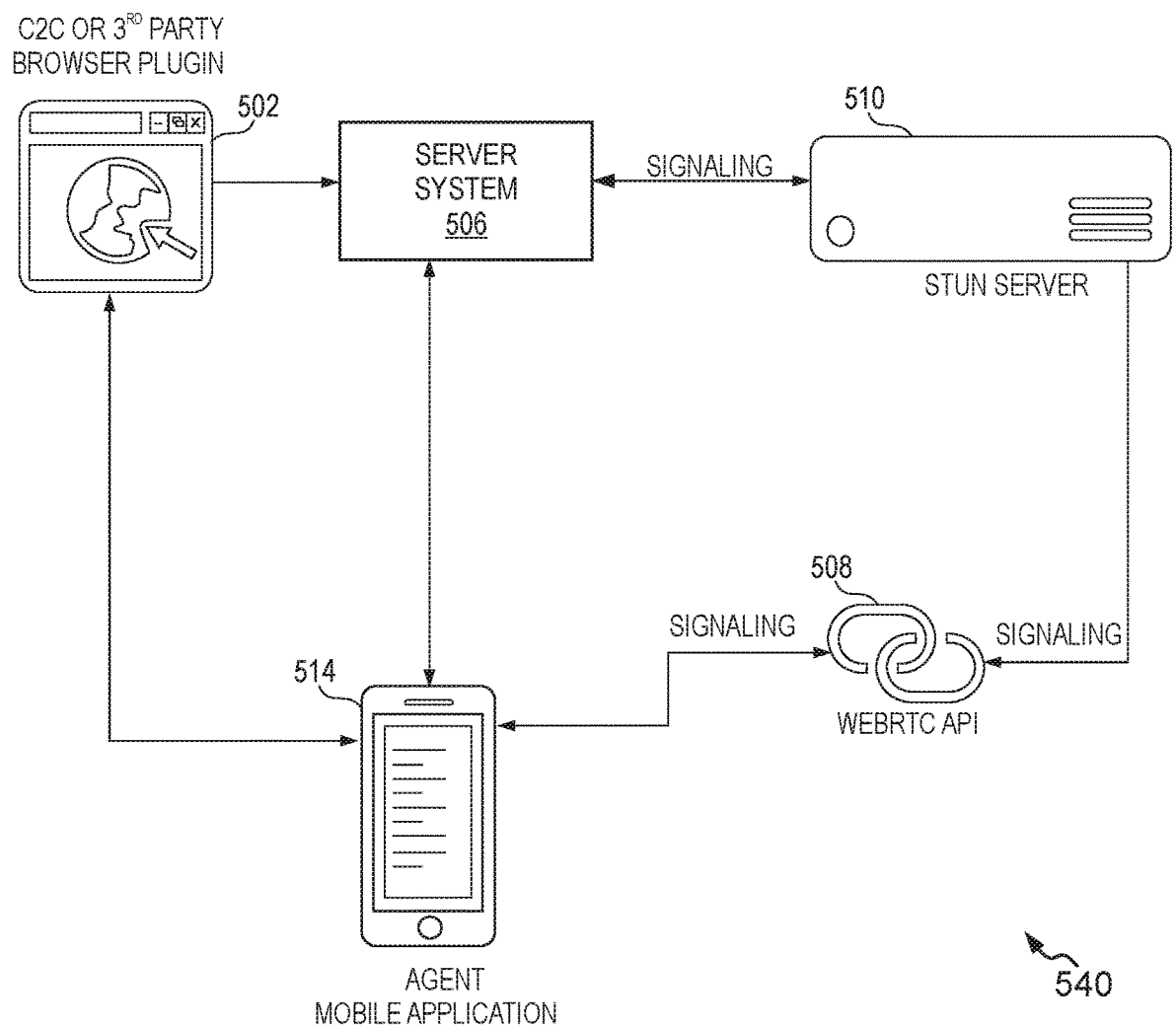
FIG. 5C is a representation depicting a communication between a third-party browser plugin and a third-party mobile application, in accordance with an embodiment of the present disclosure.

FIG. 5C is a representation 540 depicting a communication between a C2C or third-party browser plugin 502 and an agent mobile application 514, in accordance with an embodiment of the present disclosure. The agent mobile application 514 may be enabled with the C2C feature. The server system 506 may facilitate various functionalities based on the communication modes chosen by the users on the C2C or third-party browser plugin 502 and agent mobile application 514. In an example embodiment, the user associated with the C2C or third-party browser plugin 502 may initiate a communication request via a C2C application or a third-party web application on a user device such as the first user device 110. The server system 506 may determine a first communication mode selected by the user on the C2C or third-party browser plugin 502 and the second communication mode of agent mobile application 514. In the example, the first communication may be a video call and the second communication mode may be a voice note. A WebRTC API 508 and the STUN server 510 may be utilized by the server system 506 to facilitate the communication session between the C2C or third-party browser plugin 502 and an agent mobile application 514, as discussed in FIG. 5A.

Figure 5D:
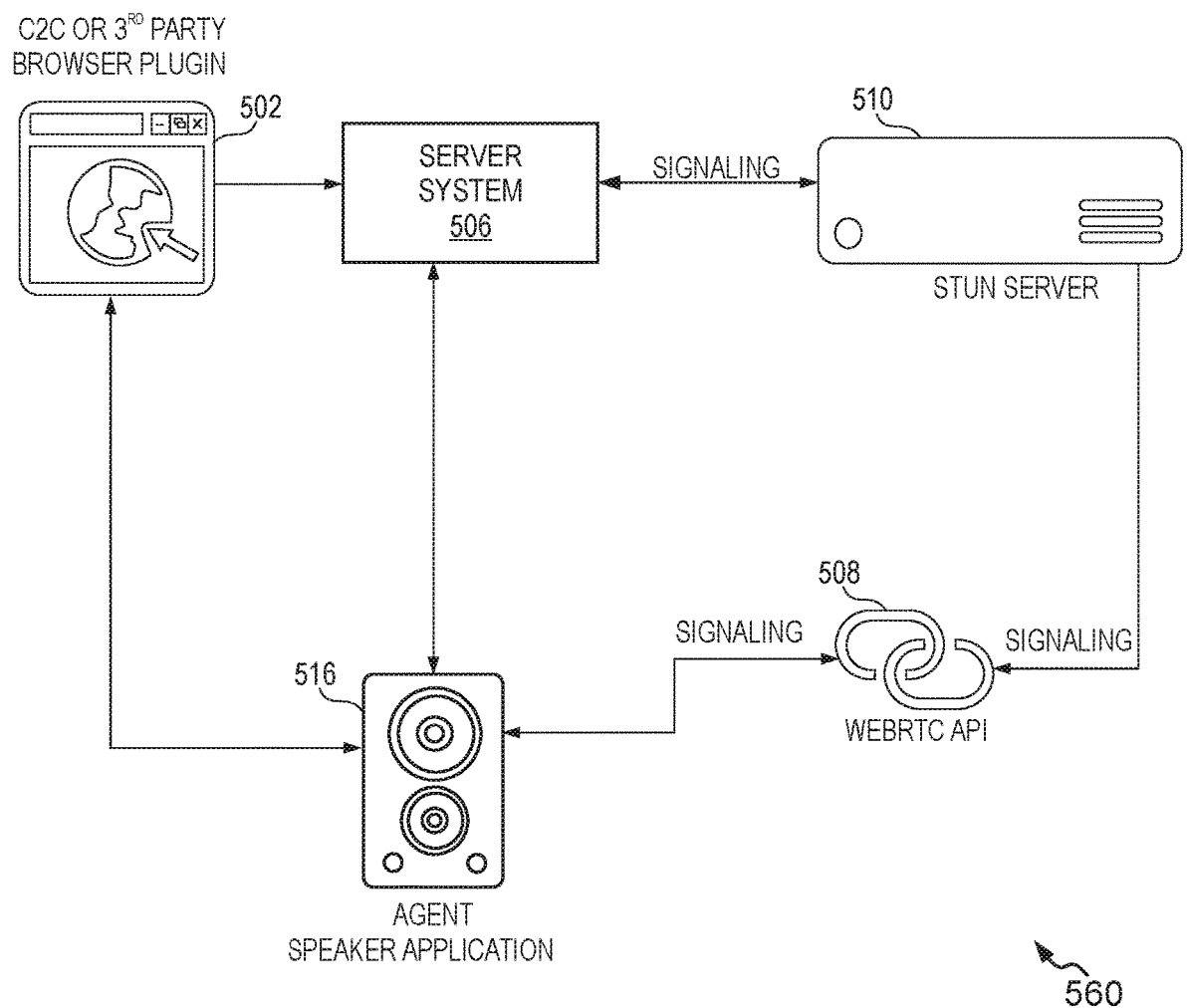
FIG. 5D is a representation depicting a communication between a third-party browser plugin and a third-party smart speaker application, in accordance with an embodiment of the present disclosure.

FIG. 5D is a representation 560 depicting a communication between a C2C or third-party browser plugin 502 and an agent speaker application 516, in accordance with an embodiment of the present disclosure. The agent speaker application 516 may be enabled with the C2C feature. The server system 506 may facilitate various functionalities based on the communication modes chosen by the users on the C2C or third-party browser plugin 502 and agent speaker application 516. In an example embodiment, the user associated with the C2C or third-party browser plugin 502 may initiate a communication request via a C2C application or a third-party web application on a user device such as the first user device 110. The server system 506 may determine a first communication mode selected by the user on the C2C or third-party browser plugin 502 and the second communication mode of agent speaker application 516. In the example, the first communication may be an audio call and the second communication mode may be a voice note. A WebRTC API 508 and the STUN server 510 may be utilized by the server system 506 to facilitate the communication session between the C2C or third-party browser plugin 502 and an agent speaker application 516, as discussed in FIG. 5A.

Figure 5E:
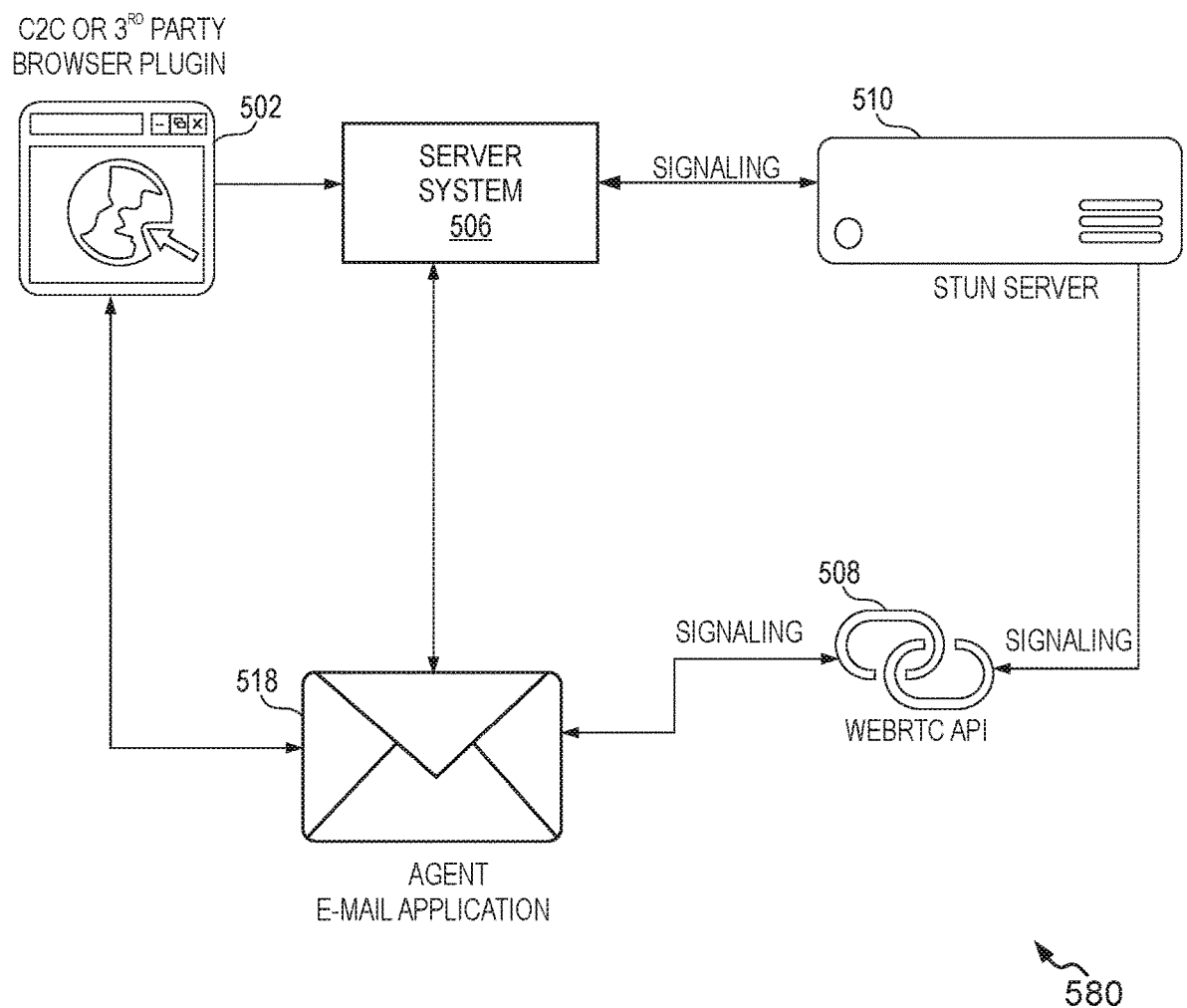
FIG. 5E is a representation depicting a communication between a third-party browser plugin and a third-party e-mail application, in accordance with an embodiment of the present disclosure.

FIG. 5E is a representation 580 depicting a communication between a C2C or third-party browser plugin 502 and an agent email application 518, in accordance with an embodiment of the present disclosure. The agent email application 518 may be enabled with the C2C feature. The server system 506 may facilitate various functionalities based on the communication modes chosen by the users on the C2C or third-party browser plugin 502 and agent email application 518. In an example embodiment, the user associated with the C2C or third-party browser plugin 502 may initiate a communication request via a C2C application or a third-party web application on a user device such as the first user device 110. The server system 506 may determine a first communication mode selected by the user on the C2C or third-party browser plugin 502 and the second communication mode of the agent email application 518. In the example, the first communication mode may be an audio call and the second communication mode may be an email. A WebRTC API 508 and the STUN server 510 may be utilized by the server system 506 to facilitate the communication session between the C2C or third-party browser plugin 502 and the agent email application 518, as discussed in FIG. 5A.

Figure 5F:
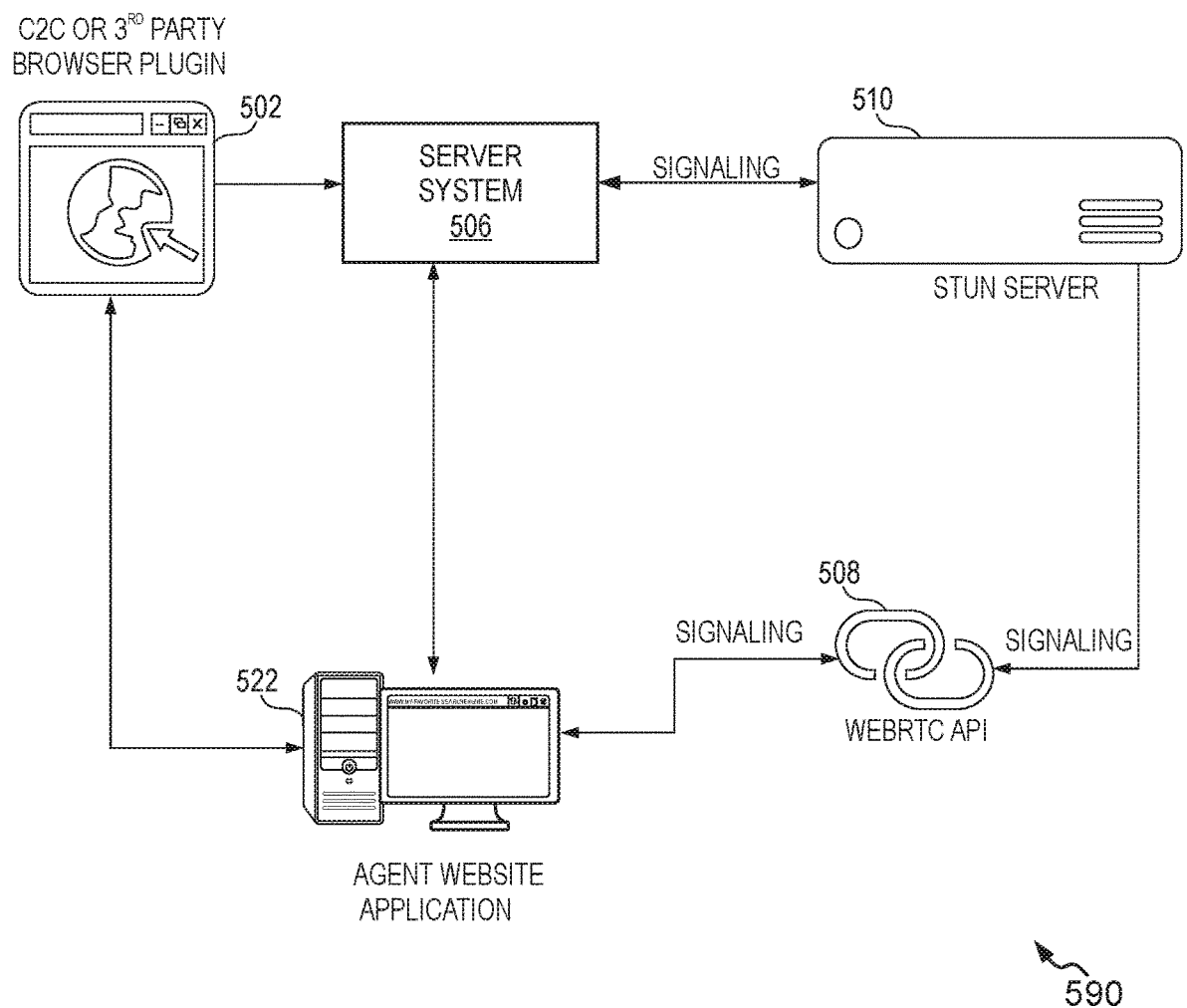
FIG. 5F is a representation depicting a communication between a C2C or third party browser plugin and an agent website application, in accordance with an embodiment of the present disclosure.

FIG. 5F is a representation 590 depicting a communication between a C2C or third-party browser plugin 502 and an agent website application 522, in accordance with an embodiment of the present disclosure. The website application 522 may be enabled with the C2C feature. The server system 506 may facilitate various functionalities based on the communication modes chosen by the users on the C2C or third-party browser plugin 502 and the agent website application 522. In an example embodiment, the user associated with the C2C or third-party browser plugin 502 may initiate a communication request via a C2C application or a third-party web application on a user device such as the first user device 110. The server system 506 may determine a first communication mode selected by the user on the C2C or third-party browser plugin 502 and the second communication mode of the agent website application 522. In the example, the first communication mode may be a video call and the second communication mode may be a voice call. A WebRTC API 508 and the STUN server 510 may be utilized by the server system 506 to facilitate the communication session between the C2C or third-party browser plugin 502 and agent website application 522, as discussed in FIG. 5A.

In FIGS. 5A-5F, all the possible combinations of communications when the first communication point is C2C or third-party browser plugin 502 are depicted. It should be noted that the similar communications are possible with different combinations for the plurality of possible first communication points such as C2C chatbot plug-in, a C2C mobile application, a C2C smart TV application, a C2C business mobile application plug-in, and a C2C desktop application.

Figure 6:
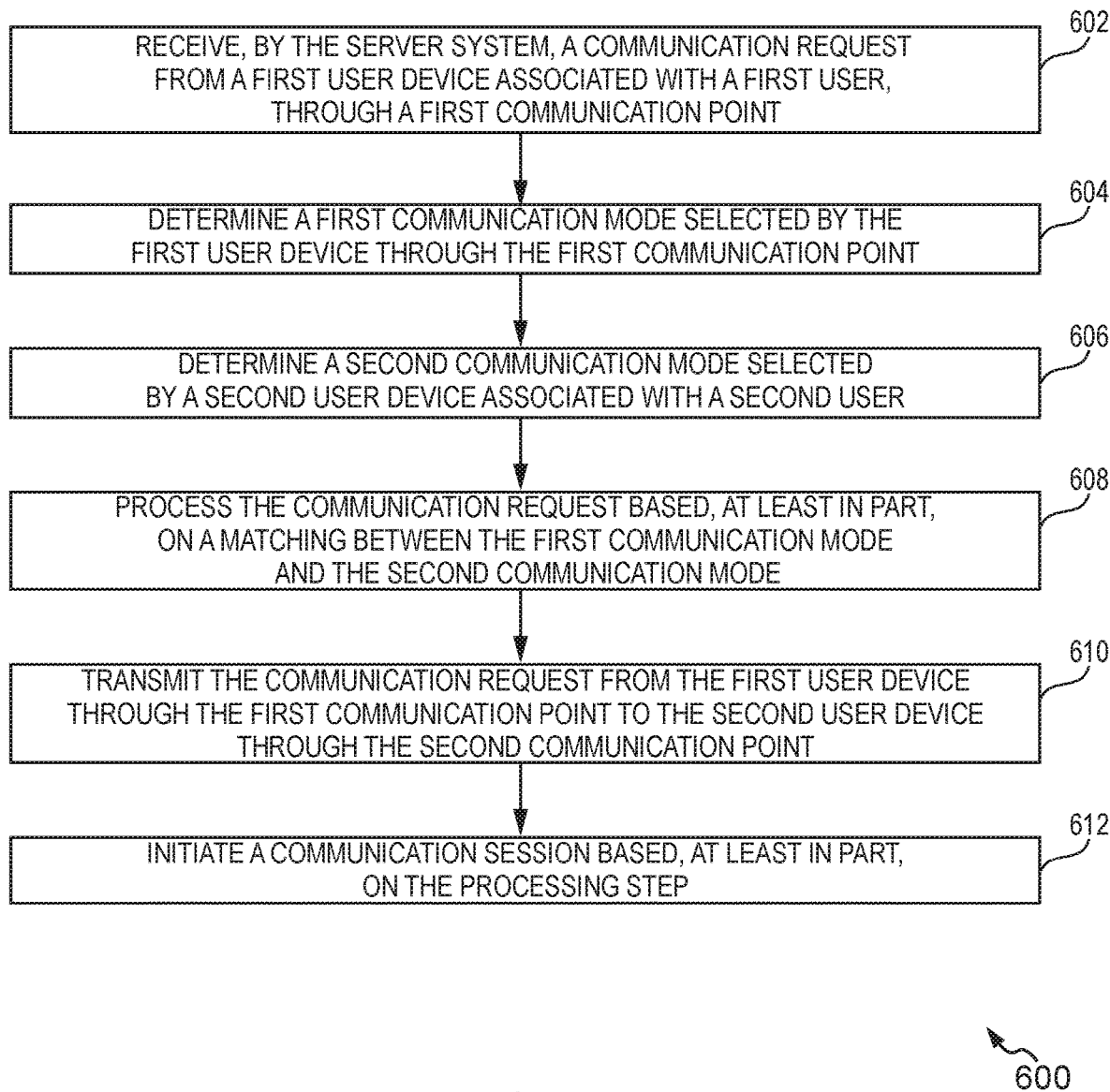
FIG. 6 is a flowchart illustrating a method for facilitating communication between different communication points, in accordance with an embodiment of the present disclosure.

FIG. 6 is a flow diagram of a method 600 for facilitating communication session between a first communication point and a second communication point based on the selected modes of communication. The method 600 depicted in the flow diagram may be executed by, for example, the at least one server system such as the server system 210. Operations of the flow diagram of method 600, and combinations of operation in the flow diagram of method 600, may be implemented by, for example, hardware, firmware, a processor, circuitry and/or a different device associated with the execution of software that includes one or more computer program instructions. The method 600 starts at operation 602.

At 602, the method 600 includes receiving, by the server system 210, a communication request from a first user device 110 associated with a first user 102, through the first communication point 118. The first communication point 118 may be enabled with a context-to-call (C2C) feature.

At 604, the method 600 includes determining, by the server system 210, a first communication mode selected by the first user device 110 through the first communication point 118. The selected mode for communication may be one of, but not limited to, a video call, a voice call, a voice note, an IM, a short message service (SMS), an email, and the like.

At 606, the method 600 includes identifying, by the server system 210, a second communication mode selected by a second user device 114 associated with a second user 106. The selected mode for communication may be one of, but not limited to, a video call, a voice call, a voice note, an IM, a short message service (SMS), an email, and the like.

At 608, the method 600 includes, processing, by the server system 210, the communication request based, at least in part, on a matching between the first communication mode and the second communication mode. In one example embodiment, the first communication mode and the second communication may be different. In another example embodiment, the first and second communication modes may be different.

At 610, the method 600 includes transmitting, by the server system 210, the communication request from the first user device 110 through the first communication point 118 to the second user device 114 through the second communication point 122. The second user device 114 and the second communication point 122 may be enabled with the context-to-call (C2C) feature.

At 612, the method 600 includes initiating, by the server system 210, a communication session based, at least in part, on the processing step. The communication session may be initiated based on the matching between the first and second communication modes.

Figure 7:
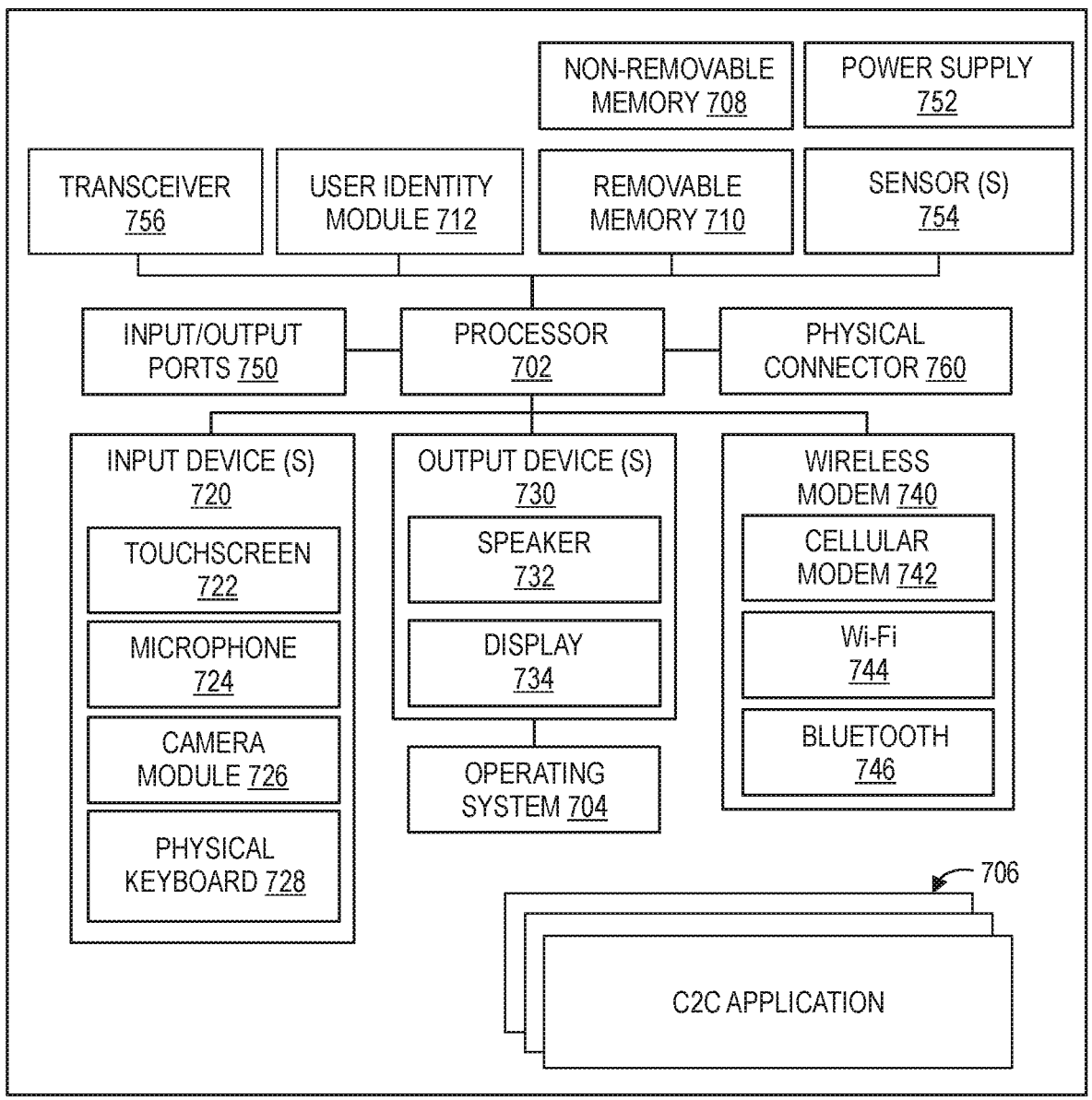
FIG. 7 is a simplified block diagram of an electronic device, in accordance with an embodiment of the present disclosure.

FIG. 7 shows simplified block diagram of a user device 700 for example a mobile phone or a desktop computer capable of implementing the various embodiments of the present disclosure. For example, the user device 700 may correspond to the user devices 110-116 of FIG. 1. The user device 700 is depicted to include one or more applications such as a C2C application 706 facilitated by the server system 210. The C2C application 706 can be an instance of an application downloaded from the server system 210 or a third-party server. The C2C application 706 is capable of communicating with the server system 210 for facilitating communication session between the user device 700 and the second user device 114 shown in FIG. 1.

It should be understood that the user device 700 as illustrated and hereinafter described is merely illustrative of one type of device and should not be taken to limit the scope of the embodiments. As such, it should be appreciated that at least some of the components described below in connection with the user device 700 may be optional and thus in an example embodiment may include more, less or different components than those described in connection with the example embodiment of the FIG. 7. As such, among other examples, the user device 700 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the user device 700 and support for one or more applications programs such as the C2C application 706, that implements one or more of the innovative features described herein. In addition to the C2C application 706, the applications may include common mobile computing applications (e.g., telephony applications, email applications, calendars, contact managers, web browsers, messaging applications) or any other computing application.

The illustrated user device 700 includes one or more memory components, for example, a non-removable memory 708 and/or removable memory 710. The non-removable memory 708 and/or the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the C2C applications 706. The user device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in the FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the user device 700 and a public switched telephone network (PSTN).

The user device 700 can further include one or more input/output ports 750, a power supply 752, one or more sensors 754 for example, an accelerometer, a gyroscope, a compass, or an infrared proximity sensor for detecting the orientation or motion of the user device 700 and biometric sensors for scanning biometric identity of an authorized user, a transceiver 756 (for wirelessly transmitting analog or digital signals) and/or a physical connector 760, which can be a USB port, IEEE 794 (FireWire) port, and/or RS-232 port. The illustrated components are not required or all-inclusive, as any of the components shown can be deleted and other components can be added.

The disclosed method with reference to FIG. 6, or one or more operations of the method 600 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fibreoptic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 210 and its various components such as the computer system 212 and the database 214 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method comprising a context-to-call (C2C) platform incorporated in a server system configured to perform the steps of:
    receiving, by the server system, a communication request from a first user device associated with a first user, through a first communication point;
    determining, by the server system, a first communication mode selected on the first user device through the first communication point;
    identifying, by the server system, a second communication mode selected on a second user device associated with a second user;
    processing, by the server system, the communication request based, at least in part, on a matching between the first communication mode and the second communication mode;
    initiating, by the server system, a communication session based, at least in part, on the processing step;
    generating, by the server system, a plurality of reports based on the communication session associated with the first user and the second user; and
    performing, by the server system, a sentiment analysis and an urgency analysis for an at least one call received from the first user device through the first communication point and directing the at least one call based on an urgency detected in the conversation.

2. The computer-implemented method as claimed in claim 1, further comprising transmitting, by the server system, the communication request from the first user device through the first communication point to the second user device through a second communication point, wherein at least one of the first communication point and the second communication point is enabled with a context-to-call (C2C) feature.

3. The computer-implemented method as claimed in claim 2, further comprising creating a conference call by enabling addition of one or more user devices to the communication session via at least one of the first communication point and the second communication point.

4. The computer-implemented method as claimed in claim 2, wherein the context-to-call (C2C) feature is provided to the first user device and the second user device as an application, by the server system.

5. The computer-implemented method as claimed in claim 1, further comprising converting, by the server system, a format of messages conveyed between the first user device and the second user device upon determining that the first communication mode and the second communication mode are different.

6. The computer-implemented method as claimed in claim 1, wherein the first communication point is one of: a C2C chatbot plug-in, a C2C mobile application, a C2C smart TV application, a C2C browser plug-in, a C2C business mobile application plugin, and a C2C desktop application.

7. The computer-implemented method as claimed in claim 1, wherein the second communication point is one of: an agent phone, a C2C agent mobile application, a third party agent mobile application, a C2C agent desktop application, a third party agent desktop application, an agent email, an agent smart speaker, a C2C agent website application, and a third party agent website application.

8. The computer-implemented method as claimed in claim 1, wherein an interaction database incorporated in the server system is configured to store user data and user profile information associated with a plurality of users and business profile information associated with a plurality of business entities.

9. The computer-implemented method as claimed in claim 1, further comprising: determining, by the server system, a context of a conversation made in the communication session between the first user device and the second user device; and
    allocating, by the server system, an agent to the first communication point, based on the determined context of the conversation.

10. The computer-implemented method as claimed in claim 1, further comprising applying, by the server system, one or more business rules over the communication request to determine whether to initiate the communication session or not.

11. The computer-implemented method as claimed in claim 1, further comprising generating, by the server system, customized recommendations for users based on previously gathered information associated with previous communication sessions of the first user device.

12. A system, comprising: a memory configured to store instructions;
   a communication interface; and
   a processor in communication with the memory and the communication interface, the processor configured to execute the instructions stored in the memory and thereby cause the system to perform at least in part to:
   receive a communication request from a first user device associated with a first user, through a first communication point;
   determine a first communication mode selected on the first user device through the first communication point;
   identify a second communication mode selected on a second user device associated with a second user;
   process the communication request based, at least in part, on a matching between the first communication mode and the second communication mode;
   initiate a communication session based, at least in part, on the processing step;
   generate a plurality of reports based on the communication session associated with the first user and the second user; and
   performing a sentiment analysis and an urgency analysis for an at least one call received from the first user device through the first communication point and directing the at least one call based on an urgency detected in the conversation.

13. The system as claimed in claim 12, wherein the system is further caused, at least in part, to transmit the communication request from the first user device through the first communication point to the second user device through a second communication point, and wherein at least one of the first communication point and the second communication point is enabled with a context-to-call (C2C) feature.

14. The system as claimed in claim 13, wherein the system is further caused, at least in part, to create a conference call by enabling addition of one or more user devices to the communication session via at least one of the first communication point and the second communication point.

15. The system as claimed in claim 13, wherein a context-to-call (C2C) feature is provided to the first user device and the second user device as an application, by the server system.

16. The system as claimed in claim 12, wherein the system is further caused, at least in part, to convert a format of messages conveyed between the first user device and the second user device upon determining that the first communication mode and the second communication mode are different.

17. The system as claimed in claim 12, wherein an interaction database incorporated in the server system is configured to store user data and user profile information associated with a plurality of users and business profile information associated with a plurality of business entities.

18. The system as claimed in claim 12, wherein the system is further caused, at least in part to:
   determine a context of a conversation made in the communication session between the first user device and the second user device; and
   allocate an agent to the first communication point, based on the determined context of the conversation.

19. The system as claimed in claim 12, wherein the system is further caused, at least in part, to apply one or more business rules over the communication request to determine whether to initiate the communication session or not.

20. The system as claimed in claim 12, wherein the system is further caused, at least in part, to generate customized recommendations for users based on previously gathered information associated with previous communication sessions of the first user device.

* * * * *